United States Patent
Lyu et al.

(10) Patent No.: US 12,345,806 B2
(45) Date of Patent: Jul. 1, 2025

(54) EXTRINSIC PARAMETER CALIBRATION FOR 4D MILLIMETER-WAVE RADAR AND CAMERA BASED ON ADAPTIVE PROJECTION ERROR

(71) Applicant: Ambarella International LP, Santa Clara, CA (US)

(72) Inventors: Sicong Lyu, Shanghai (CN); Liangliang Wang, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 422 days.

(21) Appl. No.: 17/872,895

(22) Filed: Jul. 25, 2022

(65) Prior Publication Data

US 2024/0027604 A1    Jan. 25, 2024

(51) Int. Cl.
    *G01S 13/86*      (2006.01)
    *G01S 7/40*      (2006.01)
    (Continued)

(52) U.S. Cl.
    CPC ............. *G01S 13/867* (2013.01); *G01S 7/40* (2013.01); *G01S 13/931* (2013.01);
    (Continued)

(58) Field of Classification Search
None
See application file for complete search history.

(56) References Cited

U.S. PATENT DOCUMENTS

2020/0406904 A1* 12/2020 Yan ..................... G07C 5/0841
2022/0091229 A1* 3/2022 Berry ..................... G01S 13/08
(Continued)

FOREIGN PATENT DOCUMENTS

| CN | 109683144 A | * | 4/2019 | ........... G01S 13/867 |
| CN | 111492403 A | * | 8/2020 | ......... G01C 21/1652 |
| CN | 112070841 A | * | 12/2020 | ............. G01C 25/00 |

*Primary Examiner* — Timothy A Brainard
*Assistant Examiner* — Ismaaeel A. Siddiquee
(74) *Attorney, Agent, or Firm* — Maiorana Patent Law, PA

(57) ABSTRACT

An apparatus comprises an interface and a processor. The interface may be configured to receive pixel data representing a first field of view of a camera and four-dimensional (4D) point cloud data representing a second field of view of a 4D imaging radar sensor. The first field of view of the camera and the second field of view of the 4D imaging radar sensor generally overlap. The processor may be configured to process the pixel data and the 4D point cloud data arranged as video frames and perform an extrinsic parameter calibration for the 4D imaging radar sensor and the camera based on adaptive projection error. The extrinsic parameter calibration may comprise applying a pose calibration process to the video frames. The pose calibration process may use (i) a respective translate vector and a respective rotation matrix for each of the 4D imaging radar sensor and the camera and (ii) a radar corner reflector to obtain configuration parameters for the first field of view of the camera and the second field of view of the 4D imaging radar sensor. The pose calibration process generally comprises capturing data for a plurality of positions of the radar corner reflector between a near-distance value and a long-distance value, and modifying a scale of a projection error of the radar corner reflector based on a size of the radar corner reflector in an image captured by the camera.

20 Claims, 12 Drawing Sheets

(51) Int. Cl.
*G01S 13/931* (2020.01)
*G06N 3/08* (2023.01)
*G06T 7/70* (2017.01)
*G06T 7/80* (2017.01)

(52) U.S. Cl.
CPC .............. *G01S 7/4082* (2021.05); *G06N 3/08* (2013.01); *G06T 7/70* (2017.01); *G06T 7/80* (2017.01); *G06T 2207/10016* (2013.01); *G06T 2207/10044* (2013.01); *G06T 2207/20081* (2013.01); *G06T 2207/20084* (2013.01); *G06T 2207/20104* (2013.01)

(56) References Cited

U.S. PATENT DOCUMENTS

| | | | |
|---|---|---|---|
| 2022/0180131 A1* | 6/2022 | Oblak | G01S 17/931 |
| 2023/0258769 A1* | 8/2023 | Ferguson | G01S 17/931 |
| | | | 434/2 |

* cited by examiner

EXTRINSIC PARAMETER CALIBRATION FOR 4D MILLIMETER-WAVE RADAR AND CAMERA BASED ON ADAPTIVE PROJECTION ERROR

FIELD OF THE INVENTION

The invention relates to sensor fusion generally and, more particularly, to a method and/or apparatus for implementing extrinsic parameter calibration for 4D millimeter-wave radar and camera based on adaptive projection error.

BACKGROUND

In addition to traditional three-dimensional (3D) millimeter-wave (mmw) radar, four-dimensional (4D) millimeter-wave radar with high-resolution point cloud imaging capabilities has become an industry hotspot in the past two years to meet high-precision perception requirements of high-level autonomous driving. The so-called 4D refers to distance, speed, horizontal angle (azimuth), and elevation angle. The elevation angle is added onto the basis of the original 3D millimeter-wave radar, in order to provide a 3D contour high-resolution point cloud and high-precision speed information.

However, 4D millimeter-wave radar is insensitive to non-metallic objects, especially long-distance pedestrians and non-motor-vehicle obstacles. The current 4D millimeter-wave radar also has problems such as low resolution and multi-path interference, which makes it difficult for existing 4D millimeter-wave radar to independently complete the functions of target detection and precise positioning like cameras and lidars (light detection and ranging sensors).

Currently, fusion of 4D millimeter-wave radar sensors and camera sensors has become a complementary and cost-effective solution, which can not only take advantage of the advantages of 4D millimeter-wave radar, but also may make up, to a certain extent, for the low resolution of current 4D millimeter-wave radar. In order to realize such a fusion scheme, it is first necessary to realize the external parameter calibration of the 4D millimeter-wave radar and the camera.

It would be desirable to implement extrinsic parameter calibration for 4D millimeter-wave radar and camera based on adaptive projection error.

SUMMARY

The invention concerns an apparatus comprising an interface and a processor. The interface may be configured to receive pixel data representing a first field of view of a camera and four-dimensional (4D) point cloud data representing a second field of view of a 4D imaging radar sensor. The first field of view of the camera and the second field of view of the 4D imaging radar sensor generally overlap. The processor may be configured to process the pixel data and the 4D point cloud data arranged as video frames and perform an extrinsic parameter calibration for the 4D imaging radar sensor and the camera based on adaptive projection error. The extrinsic parameter calibration may comprise applying a pose calibration process to the video frames. The pose calibration process may use (i) a respective translate vector and a respective rotation matrix for each of the 4D imaging radar sensor and the camera and (ii) a radar corner reflector to obtain configuration parameters for the first field of view of the camera and the second field of view of the 4D imaging radar sensor. The pose calibration process generally comprises capturing data for a plurality of positions of the radar corner reflector between a near-distance value and a long-distance value, and modifying a scale of a projection error of the radar corner reflector based on a size of the radar corner reflector in an image captured by the camera.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
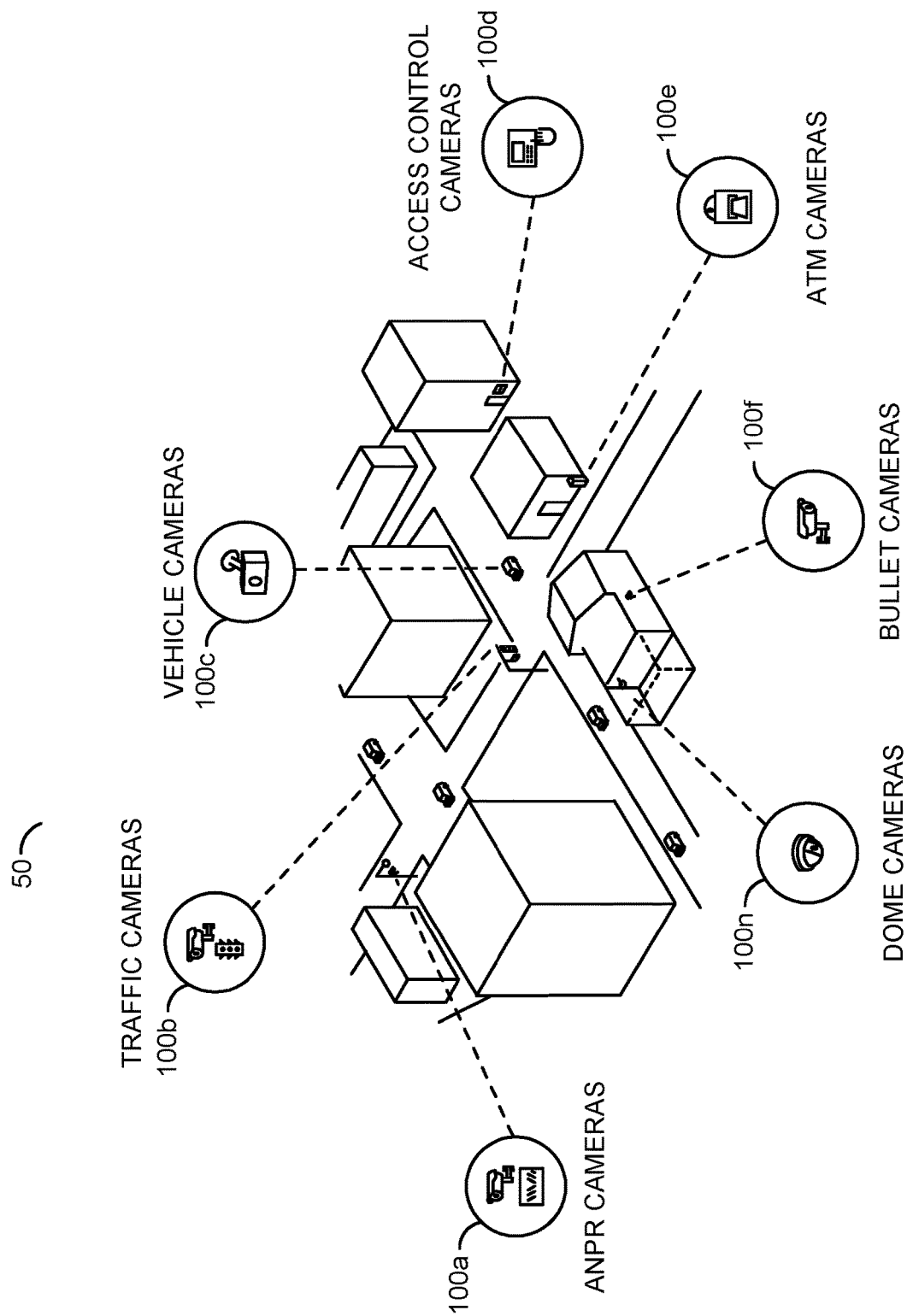
FIG. 1 is a diagram illustrating examples of edge devices that may utilize a processor configured to implement extrinsic parameter calibration for 4D millimeter-wave radar and camera based on adaptive projection error in accordance with example embodiments of the invention.

Embodiments of the present invention include providing extrinsic parameter calibration for 4D millimeter-wave radar and camera based on adaptive projection error that may (i) facilitate fusion of 4D radar point cloud images and 2D camera images, (ii) use a radar corner reflector as a calibration object, (iii) calculate a relative pose of a radar point cloud coordinate system relative to a camera coordinate system using 3D vision principles, (iv) take into account size variation of the radar corner reflector calibration object with distance from the camera, (v) evaluate accuracy of calibration results, and/or (vi) be implemented as one or more integrated circuits.

At present, most of the calibration research of millimeter-wave radar and camera is focused on the external parameter calibration between 3D millimeter-wave radar and camera.

Commonly used calibration reference objects include corner reflector, hollow metal plate, April-tag, checkerboard, etc. targets in the consensus area of millimeter-wave radar and camera. Using the corner reflector calibration reference object is more accurate than using other calibration reference objects.

When collecting data for calibration, the images of 3D millimeter-wave radar and 2D camera in multiple positions are often collected. A corresponding relationship between the 3D millimeter-wave radar and 2D camera is then established either manually or using some automatic detection algorithms to select the 3D point on the calibration reference object and the corresponding 2D point coordinates in the camera image. In an example, a fast perspective-n-point (PnP) method may be used to find the initial value of the relative pose of the 3D millimeter-wave radar and the camera, and then optimize a nonlinear least squares objective function $$\min_{R,t} \sum_{i=1}^{n} \left\| (K \cdot \Pi(P_{ci}) - p_i) \right\|^2 \qquad \text{EQ. 1}$$

for the relative pose T=[Rt] of the radar point cloud coordinate system relative to the camera coordinate system.

There are disadvantages to using existing methods. The external parameter calibration of 4D millimeter-wave radar and camera needs to ensure that the radar point cloud is projected onto the camera image through accurate coordinate transformation, and can be projected to the correct corresponding position on the camera image. For external parameter calibration of general point cloud sensors and image sensors, the least squares objective function is often constructed by the projection error of the calibrated 3D point to the corresponding 2D image coordinates, and the quality of the calibration result is evaluated directly according to the size of the projection error. However, this does not apply to the extrinsic calibration of corner reflector-based calibration of 4D millimeter-wave radars and cameras.

In the 2D camera image, a center $p_i$ of the corner reflector is taken as the coordinates of the corner reflector. The radar detects a point $P_i$ after scanning the corner reflector. Getting the point $P_i$ detected by the radar to exactly correspond to the center $p_i$ of the corner reflector as seen by the camera is not possible. The three-dimensional coordinates have a certain distance. If the corner reflector is closer to the camera, the size of the distance projected on the camera image will be more significant. Conversely, if the corner reflector is far away from the camera, the projection still fails, even if the projection error is small, because the size of the corner reflector image is smaller.

In view of the above problems and the characteristics of 4D millimeter-wave radar sensors, a corner reflector may still be chosen as the calibration reference object. In various embodiments, an optimization method based on adaptive projection error is provided to improve the accuracy of calibration results.

Referring to FIG. 1, a diagram illustrating examples of edge devices that may implement extrinsic parameter calibration for 4D millimeter-wave radar and camera based on adaptive projection error in accordance with example embodiments of the invention is shown. An overhead view of an area 50 is shown. In the example shown, the area 50 may be an outdoor location. Streets, vehicles and buildings are shown.

Devices 100a-100n are shown at various locations in the area 50. The devices 100a-100n may each implement an edge device. The edge devices 100a-100n may comprise smart IP cameras (e.g., camera systems). The edge devices 100a-100n may comprise low power technology designed to be deployed in embedded platforms at the edge of a network (e.g., microprocessors running on sensors, cameras, or other battery-powered devices), where power consumption is a critical concern. In an example, the edge devices 100a-100n may comprise various traffic cameras and intelligent transportation systems (ITS) solutions.

The edge devices 100a-100n may be implemented for various applications. In the example shown, the edge devices 100a-100n may comprise automated number plate recognition (ANPR) cameras 100a, traffic cameras 100b, vehicle cameras 100c, access control cameras 100d, automatic teller machine (ATM) cameras 100e, bullet cameras 100f, dome cameras 100n, etc. In an example, the edge devices 100a-100n may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100a-100n may be implemented at various indoor locations. In an example, the edge devices 100a-100n may implement extrinsic parameter calibration for 4D millimeter-wave radar and camera based on adaptive projection error in order to be utilized in security (surveillance) applications and/or access control applications. In an example, the edge devices 100a-100n implemented as security camera and access control applications may comprise battery-powered cameras, doorbell cameras, outdoor cameras, indoor cameras, etc. The security camera and access control applications may realize performance benefits from application of extrinsic parameter calibration for 4D millimeter-wave radar and camera based on adaptive projection error in accordance with embodiments of the invention. In an example, an edge device utilizing extrinsic parameter calibration for 4D millimeter-wave radar and camera based on adaptive projection error in accordance with an embodiment of the invention may take massive amounts of image data and make on-device inferences to obtain useful information (e.g., more accurate measurements of object position and motion) with reduced bandwidth and/or reduced power consumption. The design, type, and/or application performed by the edge devices 100a-100n may be varied according to the design criteria of a particular implementation.

Figure 2:
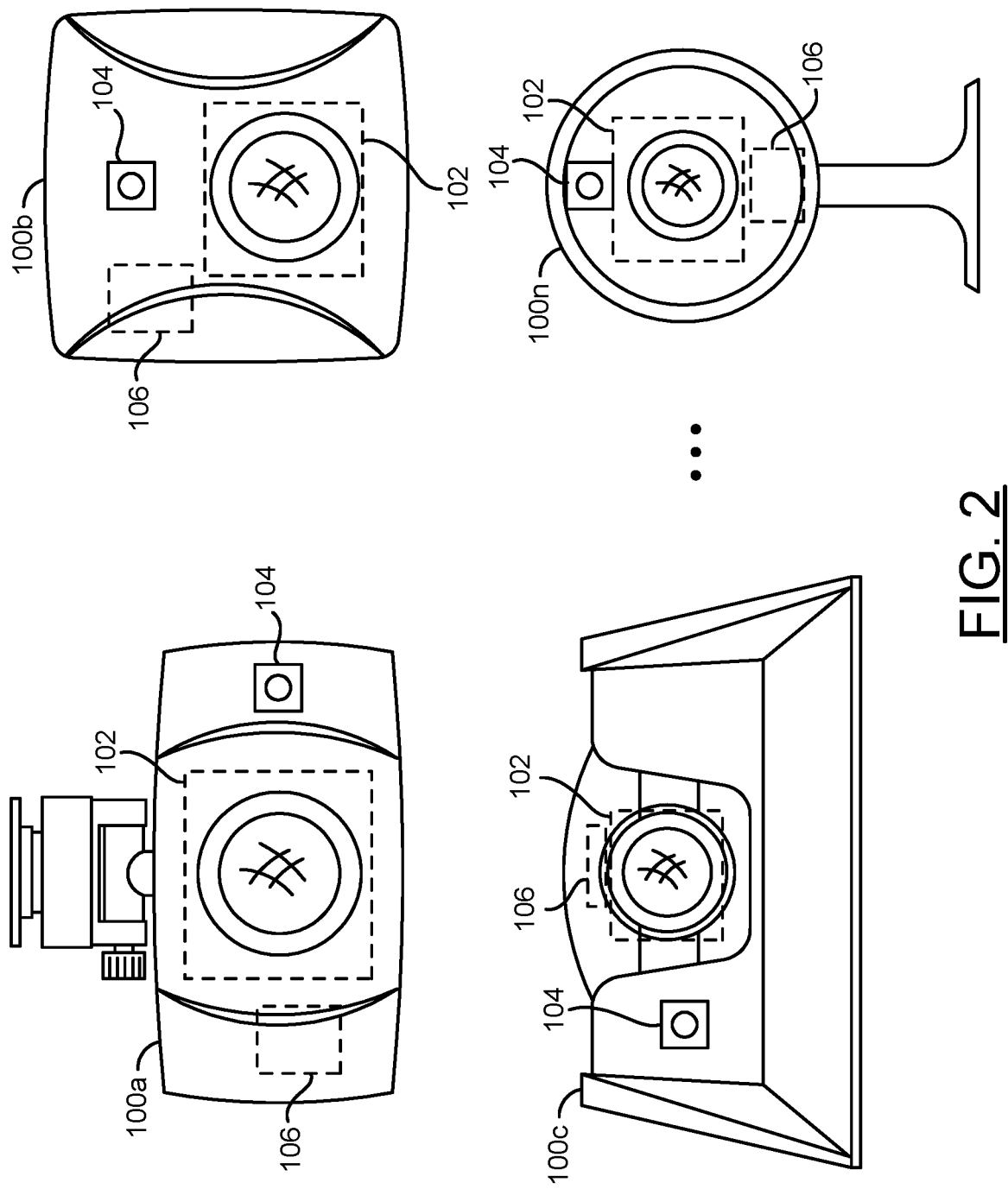
FIG. 2 is a diagram illustrating example cameras implementing an example embodiment of the present invention.

Referring to FIG. 2, a diagram illustrating example edge device cameras implementing an example embodiment of the present invention is shown. The camera systems 100a-100n are shown. Each camera device 100a-100n may have a different style and/or use case. For example, the camera 100a may be an action camera, the camera 100b may be a ceiling mounted security camera, the camera 100n may be a web cam, etc. Other types of cameras may be implemented (e.g., home security cameras, battery powered cameras, doorbell cameras, stereo cameras, etc.). The design/style of the cameras 100a-100n may be varied according to the design criteria of a particular implementation.

Each of the camera systems 100a-100n may comprise a block (or circuit) 102, a block (or circuit) 104 and/or a block (or circuit) 106. The circuit 102 may implement a capture device. The circuit 104 may implement a 4D imaging radar sensor. In an example, the circuit 104 may implement a 4D millimeter-wave (mmw) imaging radar sensor. The circuit 106 may implement a processor. The camera systems 100a-

100n may comprise other components (not shown). Details of the components of the cameras 100a-100n may be described in association with FIGS. 3 and 4.

The processor 106 may be configured to perform matrix calculations (e.g., dot product, matrix inversion, matrix transposition, etc.). The processor 106 may be configured to implement an artificial neural network (ANN). In an example, the ANN may comprise a convolutional neural network (CNN). The processor 106 may be configured to implement a video encoder. The processor 106 may be configured to process pixel data and 4D point cloud data arranged as video frames. The capture device 102 may be configured to capture pixel data that may be used by the processor 106 to generate video frames. The 4D imaging radar sensor 106 may be configured to generate a depth map images (e.g., a 4D point cloud). In various embodiments, the 4D imaging radar sensor 104 may be configured to determine a location of an object in range, azimuth, elevation, and relative speed to provide detailed information about an environment within a field of view of the 4D imaging radar sensor 104.

The cameras 100a-100n may be edge devices. The processor 106 implemented by each of the cameras 100a-100n may enable the cameras 100a-100n to implement various functionality internally (e.g., at a local level). For example, the processor 106 may be configured to perform object/event detection (e.g., computer vision operations), 3D reconstruction, video encoding and/or video transcoding on-device. For example, even advanced processes such as computer vision and 3D reconstruction may be performed by the processor 106 without uploading video data to a cloud service in order to offload computation-heavy functions (e.g., computer vision, video encoding, video transcoding, etc.).

In some embodiments, multiple camera systems may be implemented (e.g., camera systems 100a-100n), which may operate independently from each other. For example, each of the cameras 100a-100n may individually analyze the pixel data and 4D point cloud data captured and perform event/object detection locally. In some embodiments, the cameras 100a-100n may be configured as a network of cameras (e.g., security cameras, surround view cameras, etc. that send video data and point cloud data to a central device such as network-attached storage and/or a cloud service). The locations and/or configurations of the cameras 100a-100n may be varied according to the design criteria of a particular implementation.

The capture device 102 of each of the camera systems 100a-100n may comprise a single lens (e.g., a monocular camera). The processor 106 may be configured to fuse 2D camera images and 4D radar images for 3D reconstruction to generate depth images and/or disparity images without the use of stereo cameras. The processor 106 may be further configured to accelerate an alignment of a high-resolution 2D image and a high-resolution 4D point cloud image utilizing extrinsic parameters determined using extrinsic parameter calibration for 4D millimeter-wave radar and camera based on adaptive projection error in accordance with an embodiment of the invention and stored in the camera systems 100a-100n.

Figure 3:
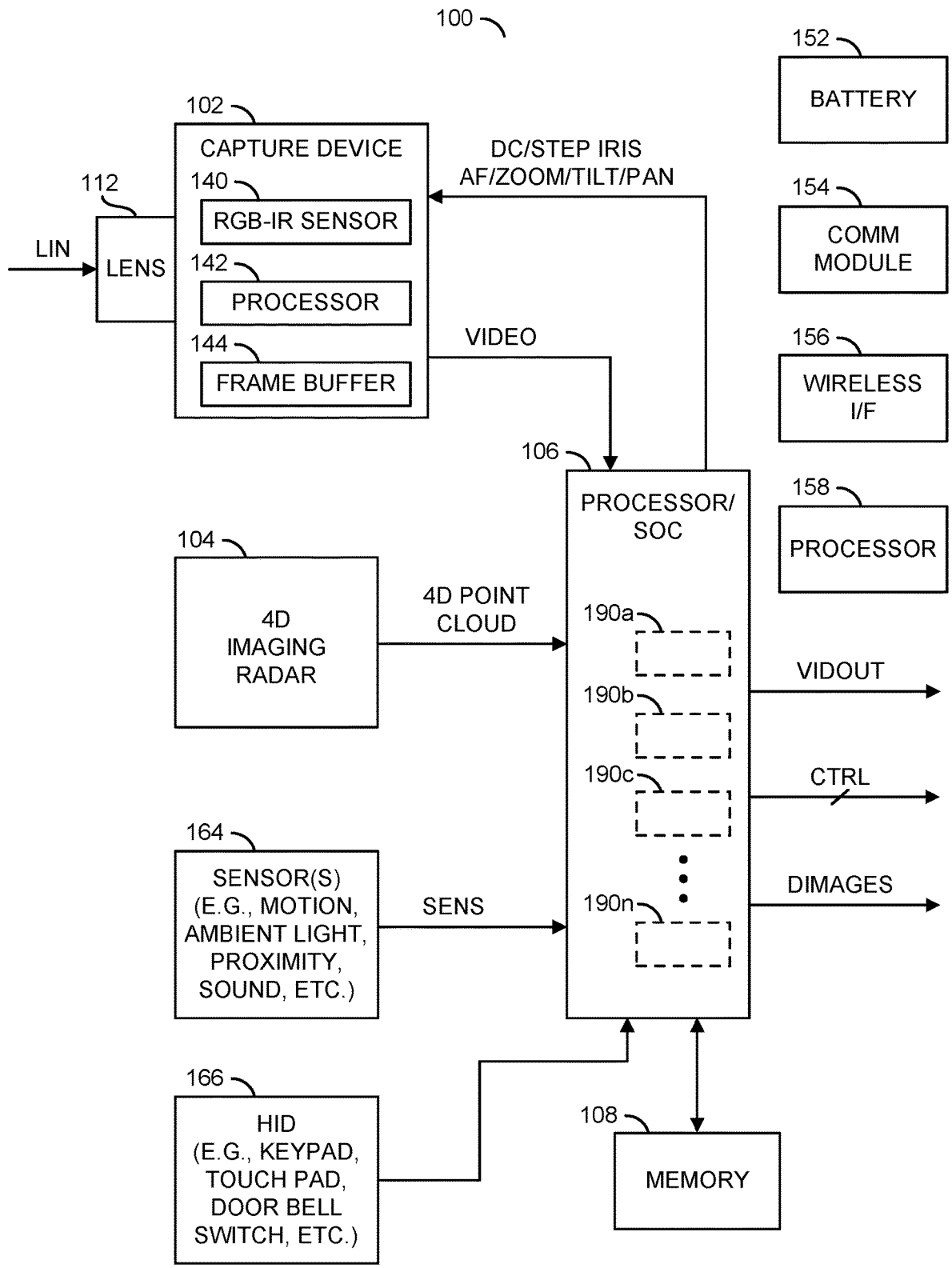
FIG. 3 is a block diagram illustrating an example radar and camera system.

Referring to FIG. 3, a block diagram of the camera system 100 is shown illustrating an example implementation. In an example, the camera system 100 may comprise the capture device 102, the 4D imaging radar sensor 104, and the processor/SoC 106 as shown in association with FIG. 2. The camera system 100 may further comprise a block (or circuit) 108, a block (or circuit) 112, a block (or circuit) 152, a block (or circuit) 154, a block (or circuit) 156, a block (or circuit) 158, a block (or circuit) 164, and/or a block (or circuit) 166. The circuit 108 may implement a memory. The block 112 may implement an optical lens. The circuit 152 may implement a battery. The circuit 154 may implement a communication device. The circuit 156 may implement a wireless interface. The circuit 158 may implement a general purpose processor. The circuit 164 may implement one or more sensors. The circuit 166 may implement a human interface device (HID). In some embodiments, the camera system 100 may comprise the capture device 102, the 4D imaging radar 104, the processor/SoC 106, the memory 108, the lens 112, the battery 152, the communication module 154, the wireless interface 156, the processor 158, and the sensors 164. In another example, the camera system 100 may comprise the capture device 102, the 4D imaging radar 104, the processor/SoC 106, the lens 112, the processor 158, and the sensors 164 as one device, and the memory 108, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

The processor 106 may be implemented as a video processor. In an example, the processor 106 may be configured to receive triple-sensor video input with high-speed SLVS/MIPI-CSI/LVCMOS interfaces. In some embodiments, the processor 106 may be configured to perform depth sensing in addition to generating video frames. In an example, the depth sensing may be performed in response to depth information and/or object data captured in the 4D point cloud images.

The memory 108 may store data. The memory 108 may implement various types of memory including, but not limited to, a cache, flash memory, memory card, random access memory (RAM), dynamic RAM (DRAM) memory, etc. The type and/or size of the memory 108 may be varied according to the design criteria of a particular implementation. The data stored in the memory 108 may correspond to a video file, 4D point cloud image file, motion information (e.g., readings from the sensors 164), video fusion parameters (e.g. extrinsic parameters of the 4D imaging radar and camera, etc.), image stabilization parameters, user inputs, computer vision models, feature sets, and/or metadata information. In some embodiments, the memory 108 may store reference images. The reference images may be used for computer vision operations, 3D reconstruction, etc.

The processor/SoC 106 may be configured to execute computer readable code and/or process information. In various embodiments, the computer readable code may be stored within the processor/SoC 106 (e.g., microcode, etc.) and/or in the memory 108. In an example, the processor/SoC 106 may be configured to execute one or more artificial neural network models (e.g., facial recognition CNN, object detection CNN, object classification CNN, 3D reconstruction CNN, etc.) stored in the memory 108. In an example, the memory 108 may store one or more directed acyclic graphs (DAGs) and one or more sets of weights and biases defining the one or more artificial neural network models. In an example, the processor/SoC 106 may be configured to execute instructions implementing a process for extrinsic parameter calibration for 4D millimeter-wave radar and camera based on adaptive projection error stored in the memory 108. In another example, the processor/SoC 106 may be configured to execute instructions implementing a sensor fusion process utilizing extrinsic parameters determined through a process for extrinsic parameter calibration for 4D millimeter-wave radar and camera based on adaptive projection error and stored in the memory 108. The processor/SoC 106 may be configured to receive input from and/or present output to the memory 108. The processor/SoC 106 may be configured to present and/or receive other signals (not shown). The number and/or types of inputs and/or outputs of the processor/SoC 106 may be varied according to the design criteria of a particular implementation. The processor/SoC 106 may be configured for low power (e.g., battery) operation.

The battery 152 may be configured to store and/or supply power for the components of the camera system 100. A dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data, and/or a control signal(s) to external devices. For example, the broadcast signal may be sent to a cloud storage service (e.g., a storage service capable of scaling on demand). In some embodiments, the communications module 154 may not transmit data until the processor/SoC 106 has performed video analytics to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 106. The processor/SoC 106 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 106 for determining which types of objects correspond to an object and/or event of interest.

The processor 158 may be implemented using a general purpose processor circuit. The processor 158 may be operational to interact with the video processing circuit 106 and the memory 108 to perform various processing tasks. The processor 158 may be configured to execute computer readable instructions. In one example, the computer readable instructions may be stored by the memory 108. In some embodiments, the computer readable instructions may comprise controller operations. Generally, input from the sensors 164 and/or the human interface device 166 are shown being received by the processor 106. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). Which of the functionality of the camera system 100 is performed by the processor 106 and the general purpose processor 158 may be varied according to the design criteria of a particular implementation.

The lens 112 may be attached to the capture device 102. The capture device 102 may be configured to receive an input signal (e.g., LIN) via the lens 112. The signal LIN may be a light input (e.g., an analog image). The lens 112 may be implemented as an optical lens. The lens 112 may provide a zooming feature and/or a focusing feature. The capture device 102 and/or the lens 112 may be implemented, in one example, as a single lens assembly. In another example, the lens 112 may be a separate implementation from the capture device 102.

The capture device 102 may be configured to convert the input light LIN into computer readable data. The capture device 102 may capture data received through the lens 112 to generate raw pixel data. In some embodiments, the capture device 102 may capture data received through the lens 112 to generate bitstreams (e.g., generate video frames). For example, the capture devices 102 may receive focused light from the lens 112. The lens 112 may be directed, tilted, panned, zoomed and/or rotated to provide a targeted view from the camera system 100 (e.g., a view for a video frame, a view for a panoramic video frame captured using multiple camera systems 100a-100n, a target image and reference image view for stereo vision, etc.). The capture device 102 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 106. In some embodiments, the pixel data generated by the capture device 102 may be uncompressed and/or raw data generated in response to the focused light from the lens 112. In some embodiments, the output of the capture device 102 may be digital video signals.

In an example, the capture device 102 may comprise a block (or circuit) 140, a block (or circuit) 142, and a block (or circuit) 144. The circuit 140 may be an image sensor. The circuit 142 may be a processor and/or logic. The circuit 144 may be a memory circuit (e.g., a frame buffer). The lens 112 (e.g., camera lens) may be directed to provide a view of an environment surrounding the camera system 100. The lens 112 may be aimed to capture environmental data (e.g., the light input LIN). The lens 112 may be a wide-angle lens and/or fish-eye lens (e.g., lenses capable of capturing a wide field of view). The lens 112 may be configured to capture and/or focus the light for the capture device 102. Generally, the image sensor 140 is located behind the lens 112. Based on the captured light from the lens 112, the capture device 104 may generate a bitstream and/or video data (e.g., the signal VIDEO).

The capture device 102 may be configured to capture video image data (e.g., light collected and focused by the lens 112). The capture device 104 may capture data received through the lens 112 to generate a video bitstream (e.g., pixel data for a sequence of video frames). In various embodiments, the lens 112 may be implemented as a fixed focus lens. A fixed focus lens generally facilitates smaller size and low power. In an example, a fixed focus lens may be used in battery powered, doorbell, and other low power camera applications. In some embodiments, the lens 112 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 102 may transform the received light into a digital data stream. In some embodiments, the capture device 102 may perform an analog to digital conversion. For example, the image sensor 140 may perform a photoelectric conversion of the light received by the lens 112. The processor/logic 142 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 102 may comprise a microphone for capturing audio. In some embodiments, the microphone may be implemented as a separate component (e.g., one of the sensors 164).

The video data captured by the capture device 102 may be represented as a signal/bitstream/data VIDEO (e.g., a digital video signal). The capture device 102 may present the signal VIDEO to the processor/SoC 106. The signal VIDEO may represent the video frames/video data. The signal VIDEO may be a video stream captured by the capture device 102. In some embodiments, the signal VIDEO may comprise pixel data that may be operated on by the processor 106 (e.g., a video processing pipeline, an image signal processor (ISP), etc.). The processor 106 may generate the video frames in response to the pixel data in the signal VIDEO.

The signal VIDEO may comprise pixel data arranged as video frames. The signal VIDEO may be images comprising a background (e.g., objects and/or the environment captured). The signal VIDEO may comprise single-channel source images. The single-channel source images may be generated in response to capturing the pixel data using the monocular lens 112.

The image sensor 140 may receive the input light LIN from the lens 112 and transform the light LIN into digital data (e.g., the bitstream). For example, the image sensor 140 may perform a photoelectric conversion of the light from the lens 112. In some embodiments, the image sensor 140 may have extra margins that are not used as part of the image output. In some embodiments, the image sensor 140 may not have extra margins. In various embodiments, the image sensor 140 may be configured to generate an RGB-IR video signal. In an infrared light only illuminated field of view, the image sensor 140 may generate a monochrome (B/W) video signal. In a field of view illuminated by both IR light and visible light, the image sensor 140 may be configured to generate color information in addition to the monochrome video signal. In various embodiments, the image sensor 140 may be configured to generate a video signal in response to visible and/or infrared (IR) light.

In some embodiments, the camera sensor 140 may comprise a rolling shutter sensor or a global shutter sensor. In an example, the rolling shutter sensor 140 may implement an RGB-IR sensor. In some embodiments, the capture device 102 may comprise a rolling shutter IR sensor and an RGB sensor (e.g., implemented as separate components). In an example, the rolling shutter sensor 140 may be implemented as an RGB-IR rolling shutter complementary metal oxide semiconductor (CMOS) image sensor. In one example, the rolling shutter sensor 140 may be configured to assert a signal that indicates a first line exposure time. In one example, the rolling shutter sensor 140 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 142 may transform the bitstream into a human viewable content (e.g., video data that may be understandable to an average person regardless of image quality, such as the video frames and/or pixel data that may be converted into video frames by the processor 106). For example, the processor/logic 142 may receive pure (e.g., raw) data from the image sensor 140 and generate (e.g., encode) video data (e.g., the bitstream) based on the raw data. The capture device 102 may have the memory 144 to store the raw data and/or the processed bitstream. For example, the capture device 102 may implement the frame memory and/or buffer 144 to store (e.g., provide temporary storage and/or cache) one or more of the video frames (e.g., the digital video signal). In some embodiments, the processor/logic 142 may perform analysis and/or correction on the video frames stored in the memory/buffer 144 of the capture device 102. The processor/logic 142 may provide status information about the captured video frames.

The 4D imaging radar sensor 104 may comprise a high-resolution 4D imaging radar. In general, the 4D imaging radar sensor 104 may be configured to determine a location of an object in range, azimuth, elevation, and relative speed to provide detailed information about an environment within view of the radar. In an example, the 4D imaging radar sensor 104 may have a field of view (FOV) that overlaps a field of view of the capture device 102.

The sensors 164 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 102. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 106. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 106 via the signal SENS.

The HID 166 may implement an input device. For example, the HID 166 may be configured to receive human input. In one example, the HID 166 may be configured to receive a password input from a user. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 102 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 106 to enable two-factor authentication.

The processor/SoC 106 may receive the signal VIDEO, the signal 4D POINT CLOUD, and the signal SENS. The processor/SoC 106 may generate one or more video output signals (e.g., VIDOUT), one or more control signals (e.g., CTRL) and/or one or more depth data signals (e.g., DIMAGES) based on the signal VIDEO, the signal 4D POINT CLOUD, the signal SENS, and/or other input. In some embodiments, the signals VIDOUT, DIMAGES and CTRL may be generated based on analysis of the signal VIDEO, the signal 4D POINT CLOUD, and/or objects detected in the signal VIDEO.

In various embodiments, the processor/SoC 106 may be configured to perform one or more of feature extraction, object detection, object tracking, 3D reconstruction and object identification. For example, the processor/SoC 106 may determine motion information and/or depth information by analyzing a frame from the signal VIDEO and comparing the frame to a previous frame. The comparison may be used to perform digital motion estimation. In some embodiments, the processor/SoC 106 may be configured to generate the video output signal VIDOUT comprising video data and/or the depth data signal DIMAGES comprising disparity maps and depth maps from the signal VIDEO. The video output signal VIDOUT and/or the depth data signal DIMAGES may be presented to the memory 108, the communications module 154, and/or the wireless interface 156. In some embodiments, the video signal VIDOUT and/or the depth data signal DIMAGES may be used internally by the processor 106 (e.g., not presented as output).

The signal VIDOUT may be presented to the communication device 156. In some embodiments, the signal VIDOUT may comprise encoded video frames generated by the processor 106. In some embodiments, the encoded video frames may comprise a full video stream (e.g., encoded video frames representing all video captured by the capture device 102). The encoded video frames may be encoded, cropped, stitched and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 106 on the video frames generated. The processor 106 may be configured to perform the computer vision operations to detect objects and/or events in the video frames and then convert the detected objects and/or events into statistics and/or parameters. In one example, the data determined by the computer vision operations may be converted to the human-readable format by the processor 106. The data from the computer vision operations may be used to detect objects and/or events. The computer vision operations may be performed by the processor 106 locally (e.g., without communicating to an external device to offload computing operations). For example, the locally performed computer vision operations may enable the computer vision operations to be performed by the processor 106 and avoid heavy video processing running on back-end servers. Avoiding video processing running on back-end (e.g., remotely located) servers may preserve privacy.

In some embodiments, the signal VIDOUT may be data generated by the processor 106 (e.g., video analysis results, audio/speech analysis results, etc.) that may be communicated to a cloud computing service in order to aggregate information and/or provide training data for machine learning (e.g., to improve object detection, to improve audio detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 106. In one example, the signal CTRL may be generated in response to objects detected and/or characteristics extracted from the video frames. The signal CTRL may be configured to enable, disable, change a mode of operations of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 106. The signal CTRL may be generated based on a type of object detected (e.g., a person, an animal, a vehicle, etc.). The signal CTRL may be generated in response to particular types of objects being detected in particular locations. The processor 106 may be configured to generate the signal CTRL in response to sensor fusion operations (e.g., aggregating information received from disparate sources). The conditions for generating the signal CTRL may be varied according to the design criteria of a particular implementation.

A multi-step approach to activating and/or disabling the capture device 102 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 106. The video analytics performed by the processor/SoC 106 may have a relatively large drain on the battery 152 (e.g., greater than the motion sensor 164). In an example, the processor/SoC 106 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 106 may be on and other components of the camera system 100 (e.g., the image capture device 102, the memory 108, the communications module 154, etc.) may be off. In another example, the camera system 100 may operate in an intermediate state. In the intermediate state, the image capture device 102 may be on and the memory 108 and/or the communications module 154 may be off. In yet another example, the camera system 100 may operate in a power-on (or high power) state. In the power-on state, the sensors 164, the processor/SoC 106, the capture device 102, the memory 108, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 102. The pixel data signals may be enhanced by the processor 106 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides nightvision, provides High Dynamic Range (HDR) imaging, provides more viewing area, highlights detected objects, provides additional data such as a numerical distance to detected objects, etc.) to enable the processor 106 to see the location better than a person would be capable of with human vision.

The encoded video frames may be processed locally. In one example, the encoded, video may be stored locally by the memory 108 to enable the processor 106 to facilitate the computer vision analysis internally (e.g., without first uploading video frames to a cloud service). The processor 106 may be configured to select the video frames to be packetized as a video stream that may be transmitted over a network (e.g., a bandwidth limited network).

In some embodiments, the processor 106 may be configured to perform sensor fusion operations. The sensor fusion operations performed by the processor 106 may be configured to analyze information from multiple sources (e.g., the capture device 102, the 4D imaging radar 104, the sensors 164, and the HID 166). By analyzing various data from disparate sources, the sensor fusion operations may be capable of making inferences about the data that may not be possible from one of the data sources alone. For example, the sensor fusion operations implemented by the processor 106 may analyze video data (e.g., mouth movements of people) as well as the speech patterns from directional audio. The disparate sources may be used to develop a model of a scenario to support decision making. For example, the processor 106 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 106 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 106. In some embodiments, the processor 106 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 106 within the camera system 100.

A video pipeline of the processor 106 may be configured to locally perform de-warping, cropping, enhancements, rolling shutter corrections, stabilizing, downscaling, packetizing, compression, conversion, blending, synchronizing and/or other video operations. The video pipeline of the processor 106 may enable multi-stream support (e.g., generate multiple bitstreams in parallel, each comprising a different bitrate). In an example, the video pipeline of the processor 106 may implement an image signal processor (ISP) with a 320 MPixels/s input pixel rate. The architecture of the video pipeline of the processor 106 may enable the video operations to be performed on high resolution video and/or high bitrate video data in real-time and/or near real-time. The video pipeline of the processor 106 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4KAVC encoding (e.g., 4KP30 AVC and HEVC encoding with multi-stream support). The type of video operations and/or the type of video data operated on by the processor 106 may be varied according to the design criteria of a particular implementation.

The camera sensor 140 may implementa high-resolution sensor. Using the high resolution sensor 140, the processor 106 may combine over-sampling of the image sensor 140 with digital zooming within a cropped area. The over-sampling and digital zooming may each be one of the video operations performed by the processor 106. The over-sampling and digital zooming may be implemented to deliver higher resolution images within the total size constraints of a cropped area.

In some embodiments, the lens 112 may implement a fisheye lens. One of the video operations implemented by the processor 106 may be a dewarping operation. The processor 106 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 106 may be configured to crop (e.g., trim to) a region of interest from a full video frame (e.g., generate the region of interest video frames). The processor 106 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 106 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 106 may be configured to crop the selected region in each frame.

The processor 106 may be configured to over-sample the image sensor 140. The over-sampling of the image sensor 140 may result in a higher resolution image. The processor 106 may be configured to digitally zoom into an area of a video frame. For example, the processor 106 may digitally zoom into the cropped area of interest. For example, the processor 106 may establish the area of interest based on the directional audio, crop the area of interest, and then digitally zoom into the cropped region of interest video frame.

The dewarping operations performed by the processor 106 may adjust the visual content of the video data. The adjustments performed by the processor 106 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 112). The dewarping operations may be implemented to correct the distortion caused by the lens 112. The adjusted visual content may be generated to enable more accurate and/or reliable object detection.

Various features (e.g., dewarping, digitally zooming, cropping, etc.) may be implemented in the processor 106 as hardware modules. Implementing hardware modules may increase the video processing speed of the processor 106 (e.g., faster than a software implementation). The hardware implementation may enable the video to be processed while reducing an amount of delay. The hardware components used may be varied according to the design criteria of a particular implementation.

The processor 106 is shown comprising a number of blocks (or circuits) 190a-190n. The blocks 190a-190n may implement various hardware modules implemented by the processor 106. The hardware modules 190a-190n may be configured to provide various hardware components to implement a video processing pipeline. The circuits 190a-190n may be configured to receive the pixel data VIDEO, generate the video frames from the pixel data, perform various operations on the video frames (e.g., de-warping, rolling shutter correction, cropping, upscaling, image stabilization, 3D reconstruction, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190a-190n may be configured to implement various security features (e.g., secure boot, I/O virtualization, etc.). Various implementations of the processor 106 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020, U.S. patent application Ser. No. 16/288,922, filed on Feb. 28, 2019, U.S. patent application Ser. No. 15/593,493 (now U.S. Pat. No. 10,437,600), filed on May 12, 2017, U.S. patent application Ser. No. 15/931,942, filed on May 14, 2020, U.S. patent application Ser. No. 16/991,344, filed on Aug. 12, 2020, appropriate portions of which are hereby incorporated by reference in their entirety.

The hardware modules 190a-190n may be implemented as dedicated hardware modules. Implementing various functionality of the processor 106 using the dedicated hardware modules 190a-190n may enable the processor 106 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, 3D reconstruction, etc.) to be performed locally by the camera system 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement a convolutional neural network (CNN) module. The CNN module 190b may be configured to perform the computer vision operations on the video frames. The CNN module 190b may be configured to implement recognition of objects through multiple layers of feature detection. The CNN module 190b may be configured to calculate descriptors based on the feature detection performed. The descriptors may enable the processor 106 to determine a likelihood that pixels of the video frames correspond to particular objects (e.g., a particular make/model/year of a vehicle, identifying a person as a particular individual, detecting a type of animal, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be configured to perform face detection, face recognition and/or liveness judgment. For example, face detection, face recognition and/or liveness judgment may be performed based on a trained neural network implemented by the CNN module 190b. In some embodiments, the CNN module 190b may be configured to generate the depth image from the structured light pattern. The CNN module 190b may be configured to perform various detection and/or recognition operations and/or perform 3D recognition operations.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190b as a dedicated hardware module of the processor 106 may enable the apparatus 100 to perform the computer vision operations locally (e.g., on-chip) without relying on processing capabilities of a remote device (e.g., communicating data to a cloud computing service).

The computer vision operations performed by the CNN module 190*b* may be configured to perform the feature detection on the video frames in order to generate the descriptors. The CNN module 190*b* may perform the object detection to determine regions of the video frame that have a high likelihood of matching the particular object. In one example, the types of object(s) to match against (e.g., reference objects) may be customized using an open operand stack (enabling programmability of the processor 106 to implement various artificial neural networks defined by directed acyclic graphs each providing instructions for performing various types of object detection). The CNN module 190*b* may be configured to perform local masking to the region with the high likelihood of matching the particular object(s) to detect the object.

In some embodiments, the CNN module 190*b* may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 112 may represent one coordinate (e.g., a location coordinate on a third axis) for a depth location of the body part in 3D space. Using the location of various body parts in 3D space, the processor 106 may determine body position, and/or body characteristics of detected people.

The CNN module 190*b* may be pre-trained (e.g., configured to perform computer vision to detect objects based on the training data received to train the CNN module 190*b*). For example, the results of training data (e.g., a machine learning model) may be pre-programmed and/or loaded into the processor 106. The CNN module 190*b* may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190*b* may be varied according to the design criteria of a particular implementation.

The CNN module 190*b* may implement the feature extraction and/or object detection by performing convolution operations. The convolution operations may be hardware accelerated for fast (e.g., real-time) calculations that may be performed while consuming low power. In some embodiments, the convolution operations performed by the CNN module 190*b* may be utilized for performing the computer vision operations. In some embodiments, the convolution operations performed by the CNN module 190*b* may be utilized for any functions performed by the processor 106 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190*b* may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190*b* may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190*b* to extract features from the training data may be varied according to the design criteria of a particular implementation.

Each of the hardware modules 190*a*-190*n* may implement a processing resource (or hardware resource or hardware engine). The hardware engines 190*a*-190*n* may be operational to perform specific processing tasks. In some configurations, the hardware engines 190*a*-190*n* may operate in parallel and independent of each other. In other configurations, the hardware engines 190*a*-190*n* may operate collectively among each other to perform allocated tasks. One or more of the hardware engines 190*a*-190*n* may be homogenous processing resources (all circuits 190*a*-190*n* may have the same capabilities) or heterogeneous processing resources (two or more circuits 190*a*-190*n* may have different capabilities).

Figure 4:
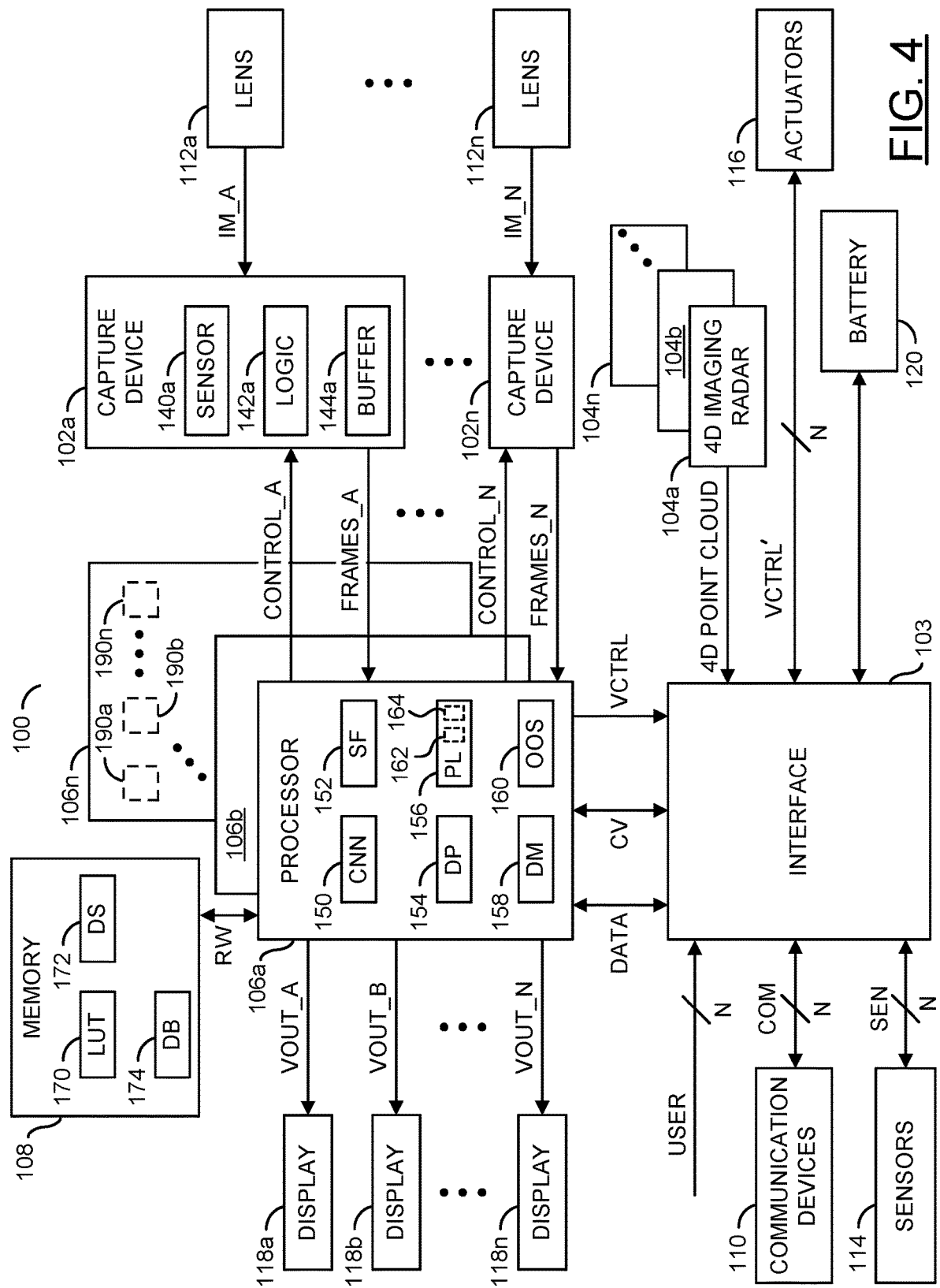
FIG. 4 is a block diagram illustrating another example radar and camera system.

Referring to FIG. 4, a diagram illustrating an apparatus in accordance with an embodiment of the invention is shown. In various embodiments, an apparatus 100 may be implemented to provide a surround view camera and sensing system in accordance with an embodiment of the invention is shown. In various embodiments, the apparatus 100 may be configured to obtain pixel data (e.g., as pixel data streams) from a plurality of cameras and 4D point cloud data from a plurality of 4D imaging radar sensors distributed around a vehicle. In an example, the apparatus 100 may be configured to process the pixel data and the 4D point cloud data as one or more frames (e.g., image frames, video frames, etc.). In an example, the apparatus 100 may be configured to perform real-time processing of the pixel data and 4D point cloud data. In an example, the apparatus 100 may be configured to generate a 3D point cloud of a surround environment of a vehicle and track a plurality of objects around the vehicle. In an example, the apparatus 100 may be configured to generate the 3D point cloud by fusing pixel data streams from cameras with 4D point cloud data from 4D imaging radars.

In an example, the apparatus 100 may comprise and/or communicate with blocks (or circuits) 102a-102n, a block (or circuit) 103, blocks (or circuits) 104a-104n, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuit 103 may implement an interface circuit. The circuits 104a-104n may each implement a 4D imaging radar device. The circuits 106a-106n may each implement a processor (or co-processors). In an example implementation, the circuits 106a-106n may each be implemented as a video processor, digital signal processor, and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed radar and camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 103 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 103 may be implemented as multiple interfaces each supporting different communication protocols. In another example, the communication devices 110 may be implemented as many modules, each implementing a different communications standard or protocol (e.g., Bluetooth, Wi-Fi, LTE, CAN bus, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a vehicle). Some of the lenses 112a-112n may be implemented to provide a targeted view of an interior of the object (e.g., a cabin or passenger compartment of the vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a stereoscopic and/or panoramic view of the environment and/or the interior of the vehicle. The lenses 112a-112n may be arranged to capture fields of view above and/or below a level of the vehicle. In some embodiments, lenses 112a-112n may be implemented having a wide angle (or fisheye) lens. A panoramic video may be generated comprising a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102a-102n may each be configured to generate raw pixel data in response to the signals IM_A-IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAMES_A-FRAMES_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n may be configured to perform depth (or distance) sensing (e.g., the signals FRAMES_A-FRAMES_N may comprise depth (or distance) information and/or vector light data in addition to the video frames). In one example, the capture devices 102a-102n and/or the processors 106a-106n may perform depth (or distance) sensing using multiple cameras (e.g., cameras configured as a stereo pair to capture a depth map). In another example, the capture devices 102a-102n and/or the processors 106a-106n may perform depth (or distance) sensing using time-of-flight. In yet another example, the capture devices 102a-102n and/or the processors 106a-106n may perform depth (or distance) sensing using structured light.

The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 103 may be configured to transmit and/or receive a number of signals. The interface circuit 103 may be configured to communicate information and/or convert information to/from various protocols. In some embodiments, the interface circuit 103 may be implemented as one of the components of the processors 106a-106n. In some embodiments, the interface circuit 103 may be implemented as a vehicle bus (e.g., a computer area network (CAN) bus). For example, for low speed communication, the vehicle CAN bus may be implemented. In some embodiments, the interface circuit 103 may implement a high speed data transmission protocol (e.g., for video transmission). For example, the interface circuit 103 may implement one or more of Ethernet, PCI-e, MIPI, etc. In some embodiments, the interface circuit 103 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface circuit 103 may send and/or receive a signal (e.g., DATA), a signal (e.g., CV), a signal (e.g., VCTRL), a signal (e.g., COM), a signal (e.g., SEN), a signal (e.g., 4D POINT CLOUD), a signal (e.g., VCTRL'), and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal 4D POINT CLOUD may represent point cloud data generated by the 4D imaging radars 104a-104n. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 103 may be varied according to the design criteria of a particular implementation.

The 4D imaging radar sensors 104a-104n may each comprise a high-resolution 4D imaging radar. In an example, the 4D imaging radar sensors 104a-104n may implement 4D millimeter-wave (mmw) imaging radars. In general, the 4D imaging radar sensors 104a-104n may be configured to determine a location of an object in range, azimuth, elevation, and relative speed to provide detailed information about an environment within view of the radar. The 4D imaging radar sensors 104a-104n may be configured to communicate information about objects in an environment within view of the radars 104a-104n as a stream of 4D point cloud data comprising range, azimuth, elevation, and relative speed. In an example, the 4D point cloud data may be communicated by the signal 4D POINT CLOUD to the interface circuit 103 and/or the processors 106a-106n. In an example, the 4D imaging radar sensors 104a-104n may have a field of view (FOV) that overlaps a field of view of the capture devices 102a-102n.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement one or more artificial neural network (ANN) modules. In an example, the block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may omit one or more of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N and/or the signal 4D POINT CLOUD, transmit the signal VCTRL and the signals (e.g., VOUT_A-VOUT_N), and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N and the sigan 4D POINT CLOUD. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, calibrated extrinsic parameters for the radars 104a-104n, etc.). The memory 108 may be configured to store computer readable/executable instructions (or firmware or code). The instructions, when executed by the processors 106a-106n, may perform a number of steps (or operations). In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians). The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera display and/or a bird's-eye view camera display. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface circuit 103. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., daytime and nighttime).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n, 4D imaging radar devices 104a-104n, and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by a 4D imaging radar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but one of the radar devices 104a-104n may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

In an example, the disparity engine 164 may be configured to determine a distance based on images captured as a stereo pair. Two or more of the capture devices 102a-102n may be configured as a stereo pair of cameras (e.g., a stereo camera). The capture devices 102a-102n configured as a stereo pair may be implemented close to each other at a pre-defined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102a-102n configured as a stereo pair, the disparity engine may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The lookup table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video and/or point cloud stitching operations to stitch together video and point cloud frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.). The processor 106n is shown comprising a number of blocks (or circuits) 190a-190n. While the blocks 190a-190n are shown on the processor 106n, each of the processors 106a-106n may implement one or more of the blocks 190a-190n. The blocks 190a-190n may implement various hardware modules implemented by the processors 106a-106n. The hardware modules 190a-190n may be configured to provide various hardware components that may be used by the processors 106a-106n to efficiently perform various operations. Various implementations of the processors 106a-106n may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 190a-190n may be implemented as dedicated hardware modules. Implementing various functionality of the processors 106a-106n using the dedicated hardware modules 190a-190n may enable the processors 106a-106n to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision algorithm to be performed in real-time. The processors 106a-106n may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information. The directed acyclic graph may define the video operations to perform for extracting the data from the video frames. For example, the directed acyclic graph may define various mathematical weighting to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One or more of the dedicated hardware modules 190a-190n may be configured to extract feature points from the video frames. The CNN module 150 may be configured to analyze pixels of the video frames and/or groups of pixels of the video frame. One or more of the dedicated hardware modules 190a-190n may be configured to perform particular mathematical operations that may be performed multiple times to perform the analysis of the pixels and/or groups of pixels. The operations performed by the dedicated hardware modules 190a-190n may be configured to calculate descriptors based on the feature points. The dedicated hardware modules 190a-190n may be configured to compare the descriptors to reference descriptors stored in the memory 108 to determine whether the pixels of the video frames correspond to a particular object.

Figure 5:
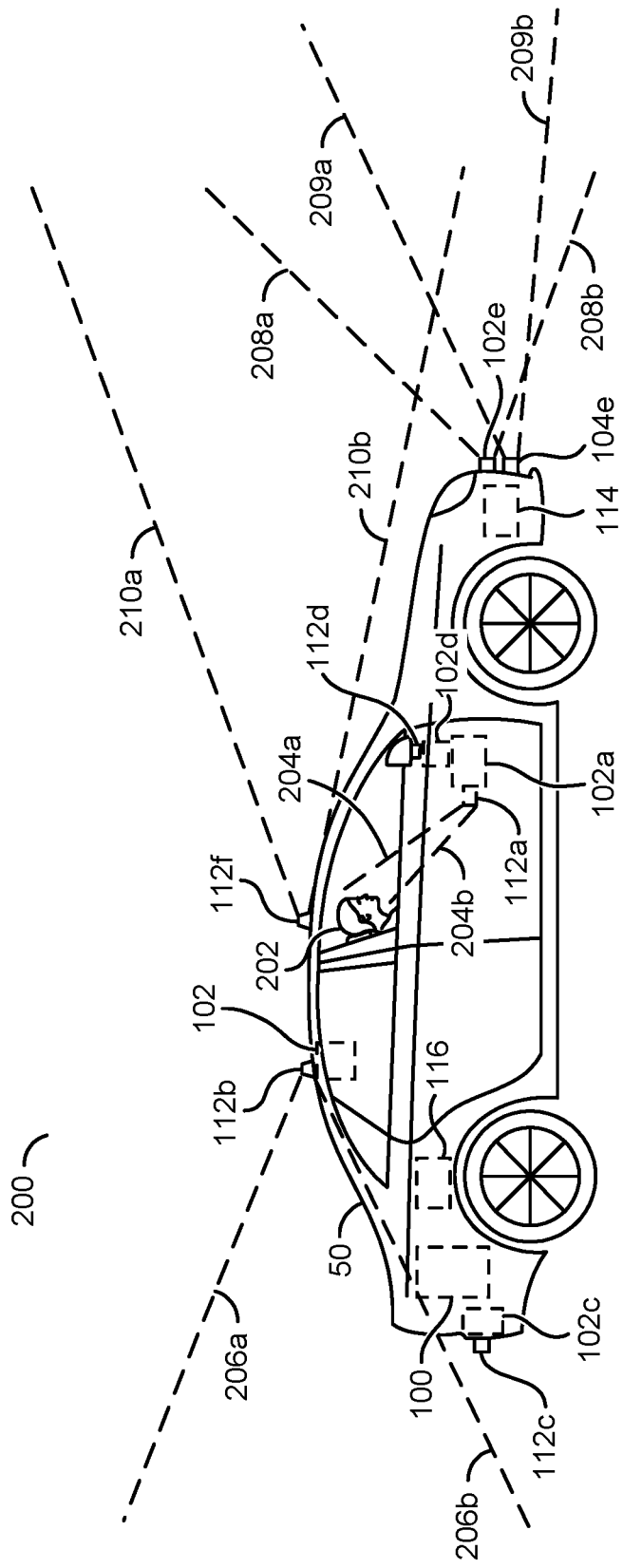
FIG. 5 is a diagram illustrating an example of radar and camera systems inside and outside of a vehicle.

Referring to FIG. 5, a diagram illustrating an example embodiment 200 of radar and camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle In another example, the apparatus 100 may be distributed throughout the ego vehicle 50 (e.g., connections may be implemented between the apparatus 100 and the capture devices 102a-102d, the 4D imaging radars 104a-104n, and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b captured by the lens 112e and the capture device 102e) may provide a front exterior view of an area. A targeted view (e.g., represented by a line 209a and a line 209b covered by the 4D imaging radar 104e) may provide another front exterior view of the area. In another example, a redundant targeted view (e.g., represented by a line 210a and a line 210b captured by the lens 112f) may provide an alternate front exterior view of an area. Redundant targeted views (e.g., targeted views that generally cover the same area) may provide a failover system and/or provide a secondary data set. The number of cameras and/or radars implemented, a direction captured, an orientation of the cameras and/or radars, and/or an arrangement of the cameras and/or radars may be varied according to the design criteria of a particular implementation.

The capture devices 102a-102n may be configured to capture video data of the environment around (e.g., area near) the ego vehicle 50. The 4D imaging radar sensors 104a-104n may be configured to capture 4D point cloud data of the environment around (e.g., area near) the ego vehicle 50. The processors 106a-106n may implement computer vision and sensor fusion to detect objects and/or understand what is happening near the ego vehicle 50 (e.g., see the environment as a human driver would see the environment). The sensors 114 may be implemented using proximity detection technology. For example, the vehicle sensors 114 may implement additional sensing using a radar device, an array of radars, a sonar device, an array of sonars, a light detection and ranging (lidar) device, an array of lidar devices, an ultra-sound device, an array of ultra-sound devices, etc.

The sensor fusion module 152 may aggregate data from the capture devices 102a-102n, the 4D imaging radar sensors 104a-104n, the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location, and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114, and/or internally generated signals such as signals generated by the processors 106a-106n in response to analysis of the video data, the 4D point cloud data, and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious), and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the use of the plurality of capture devices 102a-102n and the sensors 114 (e.g., radar, time-of-flight (ToF), occupancy sensors, temperature sensors, location/orientation sensors, ultrasonic, etc.). The type of capture devices and/or sensors implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the lookup table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., an RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames.

The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may note directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 6:
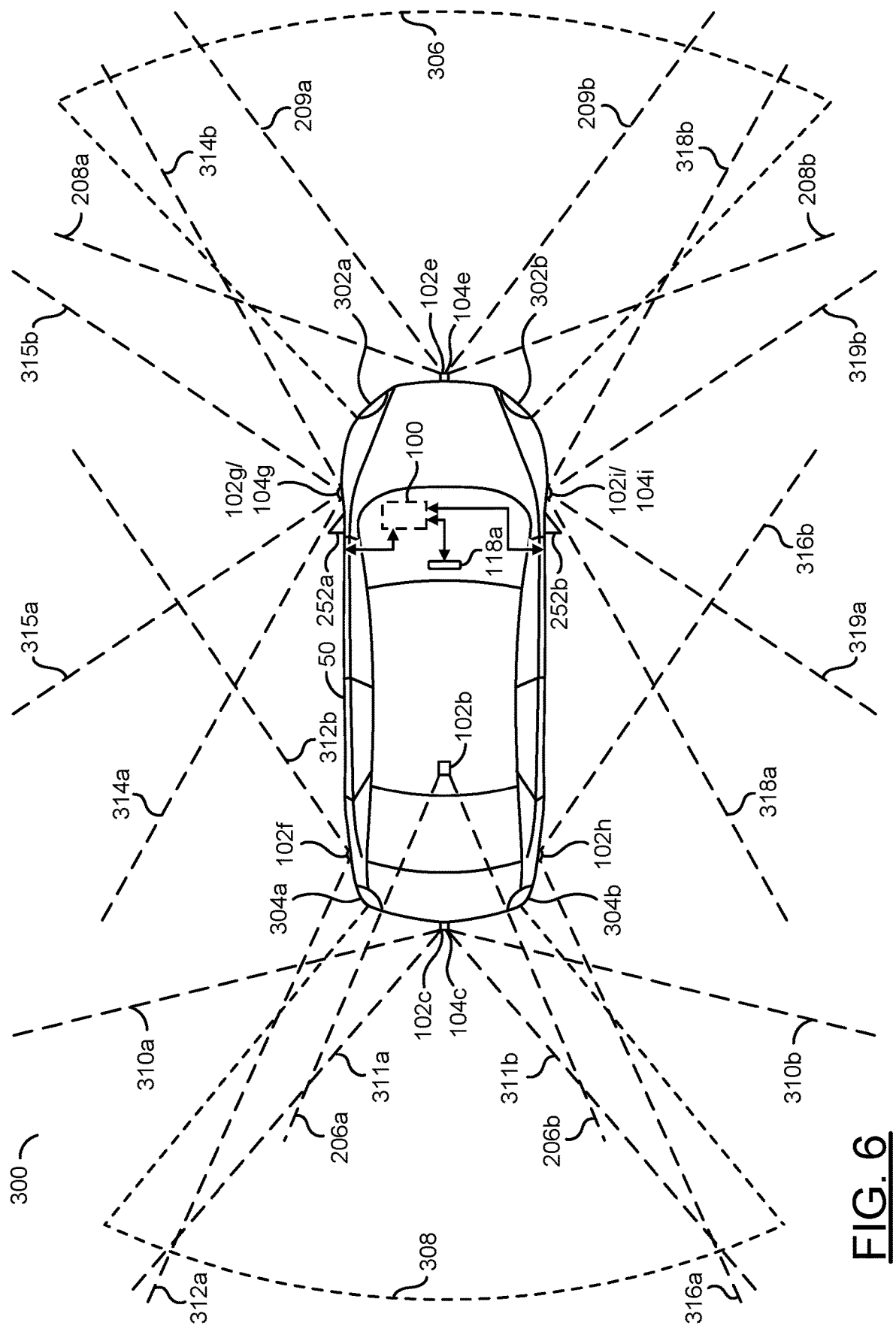
FIG. 6 is a diagram illustrating a vehicle radar and camera system capturing an all-around view.

Referring to FIG. 6, a diagram illustrating an exterior view from a vehicle and areas of illumination around the vehicle is shown. An overhead (or bird's eye) view 300 of the ego vehicle 50 is shown. The apparatus 100 is shown within the ego vehicle 50. A subset of the capture devices 102a-102n and the 4D imaging radar devices 104a-104n are shown on the ego vehicle 50. The display 118a is shown within the ego vehicle 50. While only one of the displays 118a is shown as a representative example, generally the ego vehicle 50 may comprise more than one of the displays 118a-118n.

Front headlights 302a-302b are shown on a front end of the ego vehicle 50. Rear taillights 304a-304b are shown on a rear end of the ego vehicle 50. The front headlights 302a-302b may be configured to provide illumination out towards the front of the ego vehicle A dotted shape 306 is shown in front of the ego vehicle 50 and extending from the front headlights 302a-302b. The dotted shape 306 may represent a range of illumination generated by the front headlights 302a-302b. Similarly, a dotted shape 308 is shown behind the ego vehicle 50 and extending from the rear taillights 304a-304b. The dotted shape 308 may represent a range of illumination generated by the rear taillights 304a-304b. The color, intensity and/or range of light of the front illumination 306 and the rear illumination 308 may be varied according to the design criteria of a particular implementation.

In the example overhead view 300, the capture device 102b, the capture device 102c, the capture device 102e, the capture device 102f, the capture device 102g, the capture device 102h, and the capture device 102i are shown. The 4D imaging radar 104c, the 4D imaging radar 104e, the 4D imaging radar 104g, and the 4D imaging radar 104i are also shown. Each of the capture devices 102a-102i may be directed to capture a different field of view. Each of the 4D imaging radars 104a-104i may be directed to capture a different field of view that overlaps a respective field of view of the capture devices 102a-102i. As shown in association with FIGS. 5, the lens 112b of the capture device 102b may capture the field of view 206a-206b to provide a view behind the ego vehicle 50 and the lens 112e of the capture device 102e may capture the field of view 208a-208b to provide a view in front of the ego vehicle 50. The 4D imaging radar may also capture the field of view 209a-209b to provide a view in front of the ego vehicle 50. Dotted lines 310a-310b and 311a-311b are shown extending from the capture device 102c and the 4D imaging radar 104c, respectively (e.g., from a rear bumper location). The dotted lines 310a-310b may represent the field of view captured by the lens 112c and the dotted lines 311a-311b may represent the field of view captured by the 4D imaging radar 104c. The fields of view 310a-310b and 311a-311b may provide wide angle fields of view towards the rear of the ego vehicle 50.

Dotted lines 312a-312b are shown extending from the capture device 102f (e.g., from a rear driver side location). The dotted lines 312a-312b may represent the field of view captured by the lens 112f. The field of view 312a-312b may provide a rear driver side field of view out from the ego vehicle 50. Dotted lines 314a-314b and 315a-315b are shown extending from the capture device 102g and 4D imaging radar device 104g, respectively (e.g., located below the driver side mirror 252a). The dotted lines 314a-314b may represent the field of view captured by the lens 112g. The dotted lines 315a-315b may represent the field of view captured by the 4D imaging radar 104g. The fields of view 314a-314b and 315a-315b may provide a driver side field of view out from the ego vehicle 50. Dotted lines 316a-316b are shown extending from the capture device 102h (e.g., from a rear passenger side location). The dotted lines 316a-316b may represent the field of view captured by the lens 112h. The field of view 316a-316b may provide a rear passenger side field of view out from the ego vehicle 50. Dotted lines 318a-318b and 319a-319b are shown extending from the capture device 102i and the 4D imaging radar device 104i, respectively (e.g., located below the passenger side mirror 252b). The dotted lines 318a-318b may represent the field of view captured by the lens 112i. The dotted lines 319a-319b may represent the field of view captured by the 4D imaging radar 104i. The fields of view 318a-318b and 319a-319b, respectively, may provide a passenger side field of view out from the ego vehicle 50.

In an example, each of the fields of view captured by the lenses 112a-112n may be presented as video data to the displays 118a-118n and/or analyzed by the processors 106a-106n. The lenses 112a-112n, the 4D imaging radars 104a-104n, and the corresponding fields of view (e.g., the fields of view 206a-206b, 208a-208b, 209a-209b, 310a-310b, 311a-311b, 312a-312b, 314a-314b, 315a-315b, 316a-316b, 318a-318b, and 319a-319b) are shown as an illustrative example.

In some embodiments, the apparatus 100 may implement an all-around view system utilizing at least four of the capture devices 102a-102n and four of the 4D imaging radars 104a-104n. For example, the capture device 102e implemented on a front of the ego vehicle 50, the capture device 102c implemented on a rear of the ego vehicle the capture device 102g implemented below the driver side view mirror 252a and the capture device 102i implemented below the passenger side view mirror 252b may be sufficient to capture the all-around view 254a-254d. In an example, the at least four capture devices 102a-102n may be implemented as part of stereo cameras, each acquiring stereo images of the respective fields of view 206a-206b, 208a-208b, 310a-310b, 312a-312b, 314a-314b, 316a-316b and 318a-318b. The arrangement of the capture devices 102a-102n and 4D imaging radars 104a-104n may be varied according to the design criteria of a particular implementation.

The processors 106a-106n may be configured to combine the video data captured by the capture devices 102a-102n to form an all-around view of the vehicle 50. The exterior field of view may be a 360 degree field of view (e.g., a field of view that captures video data in all or most directions around the ego vehicle 50, a field of view that surrounds the ego vehicle 50, etc.). Pixel data generated by the capture devices 102a-102i and the corresponding fields of view (e.g., the fields of view 206a-206b, 208a-208b, 310a-310b, 312a-312b, 314a-314b, 316a-316b and 318a-318b) and/or data from other capture devices (e.g., the capture devices 102j-102n, not shown) may be combined to enable the processors 106a-106n to have access to video data over the full 360 degree field of view.

In some embodiments, the processors 106a-106n may be configured to perform video stitching operations and/or de-warping operations to form the 360 degree field of view. In some embodiments, the processors 106a-106n may be configured to analyze the video data captured by each of the capture devices 102a-102n and aggregate the results to make inferences about all the video data in the all-around view (e.g., the video data from each field of view may be analyzed individually, and the results may be combined to effectively create the 360 degree field of view, even if a single video stream of all 360 degrees around the ego vehicle 50 is never actually created).

In some embodiments, the all-around view may have a generally circular shape for the 360 degree field of view. The particular shape of the 360 degree field of view may not be circular. For example, the range of each of the capture devices 102a-102n may be different. In another example, the physical location of the capture devices 102a-102n on the ego vehicle may determine how far from the ego vehicle 50 the all-around view is able to reach. The available lighting may be a limitation on the range of the all-around view. The 360 degree field of view may have an irregular shape. The range of the 360 field of view may extend farther from the ego vehicle 50 than shown. In some embodiments, the 360 degree field of view may be spherical (e.g., capture the environment above the ego vehicle 50). In some embodiments, the all-around view may not be a full 360 degree field of view (e.g., locations below the ego vehicle 50 may not be captured).

The processors 106a-106n may be further configured to perform computer vision operations on the video data captured in the all-around view (which may provide an approximation of what the driver 202 would be able to see if the driver 202 was in the ego vehicle 50 and looking in multiple directions simultaneously) and more. For example, the computer vision operations performed by the processors 106a-106n may be configured to detect and/or recognize objects. The computer vision operations performed by the processors 106a-106n may be further configured to detect characteristics of objects and/or changes to the characteristics over time.

Vehicles generally do not have side lighting. While the front headlights 302a-302b and the rear taillights 304a-304b may provide sufficient lighting for the capture devices 102a-102n towards the front and rear of the ego vehicle 50, dark areas may remain at the sides of the ego vehicle 50. Dark areas may reduce visibility in portions of the all-around view. In some embodiments, side lighting (e.g., a small LED or LED strip) may be added to the sides of the ego vehicle 50 to reduce and/or eliminate dark areas. The added illumination may also improve image clarity to enable the driver 202 to have a kind of in-person view of the immediate surroundings of the ego vehicle 50.

In an example, dark areas may be caused by lack of sunlight and/or artificial light. In an example, dark areas may be caused by the time of day (e.g., lack of sunlight at night). In another example, dark areas may be caused by a shadow (e.g., an object obstructing sunlight). In yet another example, dark areas may be caused by being located within an interior environment (e.g., a parking garage may have insufficient artificial lighting).

Dark areas may result in inaccuracies in the object detection performed by the processors 106a-106n. For example, dark areas may result in less ambient light being captured by the lenses 112a-112n (e.g., weaker input signals IM_A-IM_B). Dark areas may result in video frames being generated by the processors 106a-106n that have fewer visible details. If the video frames have fewer details visible, then the CNN module 150 may not have sufficient data for analysis to detect objects.

Generally, the front illumination 306 may provide lighting that may reduce and/or eliminate dark areas within the range of the front illumination 306. For example, the front headlights 302a-302b may provide sufficient lighting towards the front of the ego vehicle 50 for the front-mounted capture device 102e. Generally, the rear illumination 308 may provide lighting that may reduce and/or eliminate dark areas within the range of the rear illumination 308. For example, the rear taillights 304a-304b may provide sufficient lighting towards the rear of the ego vehicle 50 for the rear-mounted capture device 102c. Generally, side lighting (e.g., a small LED or LED strip) added to the sides of the ego vehicle 50 may provide lighting that may reduce and/or eliminate dark areas within the range of the side illumination. For example, the side lights may provide sufficient lighting towards the sides of the ego vehicle 50 for the side-mounted capture devices 102f, 102g, 102h, and 102i.

Computer vision may be the primary source of data for the apparatus 100 to understand the environment around the ego vehicle 50. The sensor fusion module 152 may be configured to combine information about the objects detected from analyzing the video data and radar data captured with a detection of objects using the proximity sensors (e.g., one or more of the sensors 114). The sensor fusion module 152 may be further configured to mathematically weight the information received from the computer vision operations (e.g., modify coefficients to represent how likely the detections made by the computer vision operations are correct based on the detections made by the proximity sensors). For example, the sensor fusion module 152 may be configured to mathematically weight the information provided by each sensor (e.g., a confidence level of the computer vision detection, a confidence level of the detection of the radar detection, a confidence level of the detection of the sensors 114, the distance limitations of the sensors 114, whether the computer vision or the radar detects the object at a distance beyond the range of the sensors 114, etc.).

The ego vehicle 50 may implement the apparatus 100 that enables computer vision and 360 degree cameras to provide the all-around view and the additional sensors 114 (e.g., such as ultrasonics, radars, gyroscope, accelerometer, etc.). The additional sensors 114 may provide supplemental information about the environment near the ego vehicle 50. Some of the supplemental information (e.g., from the 4D imaging radars 104a-104n) may provide data about objects/obstacles near the ego vehicle 50 that the capture devices 102a-102n may not be capable of detecting because of dark areas on the sides of the ego vehicle 50. However, the additional sensors 114 may not provide sufficient information for all autonomous driving maneuvers. Furthermore, if dark areas on the sides of the ego vehicle 50 prevent computer vision operations, the results of the computer vision analysis may not be available to provide redundancy and/or error-checking for the sensors 114.

The processors 106a-106n may be configured to detect events. In some embodiments, the event may be information that warrants being brought to the attention of the driver 202. In some embodiments, the event may be information about the nearby vehicles. In some embodiments, the event may be a detected scenario that the apparatus 100 should react to autonomously (e.g., avoid collisions, provide warnings, store information, avoid roadway hazards such as potholes, etc.). For example, whether a detected scenario is considered an event may be determined by the decision module 158. In one example, the event may correspond to detecting a scenario that may correspond to an autonomous driving maneuver (e.g., detecting a parking spot). The events may be detected based on the computer vision operations performed on the video data captured using the capture devices 102a-102n and the 4D point cloud data captured using the 4D imaging radar sensors 104a-104n. The events may be detected based on readings from the sensors 114. For example, the sensor fusion module 152 may be configured to combine information determined using the computer vision operations and information detected using the sensors 114 to make inferences that may be used by the decision module 158.

Figure 7:
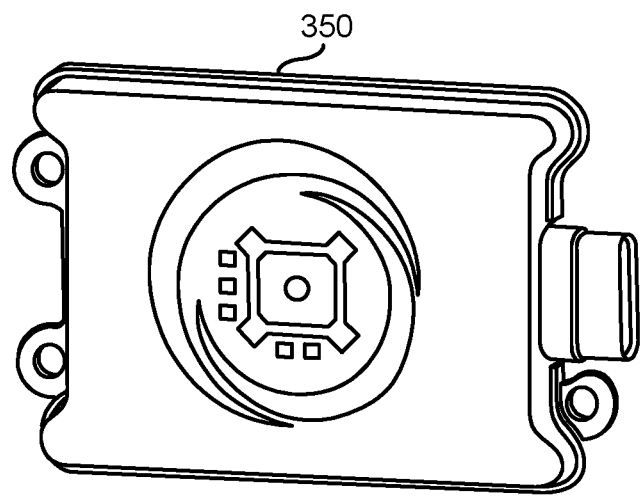
FIG. 7 is a diagram illustrating a 4D millimeter-wave imaging radar sensor.

Referring to FIG. 7, a diagram is shown illustrating a 4D millimeter-wave (mmw) imaging radar sensor 350. The 4D millimeter-wave imaging radar sensor 350 may be used to implement the 4D imaging radar sensors 104 and 104a-104n described above. The 4D mmw imaging radar sensor 350 may comprise a high-resolution 4D imaging radar. In general, the 4D mmw imaging radar sensor 350 may be configured to determine a location of an object in range, azimuth, elevation, and relative speed to provide detailed information about an environment within view of the radar. In an example, the 4D mmw imaging radar sensor 350 may have a field of view (FOV) of 120 degrees azimuth and 30 degrees elevation. In an example, the 4D mmw imaging radar sensor 350 may be implemented using a device such as the Eagle or Falcon devices available from Oculii, Inc.

Figure 8:
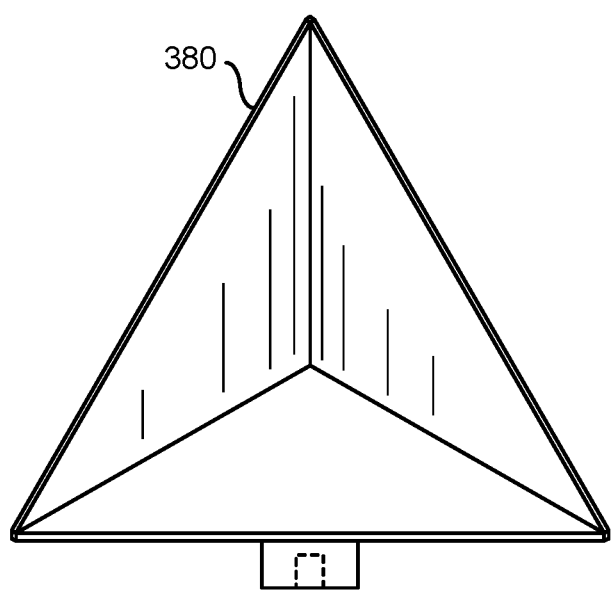
FIG. 8 is a diagram illustrating a radar corner reflector.

Referring to FIG. 8, a diagram is shown illustrating a radar corner reflector 380. Radar corner reflectors are designed to reflect microwave radio waves emitted by a radar transmitter back along the same path toward a radar receiver. Because the radio waves are reflected back along the same path, a strong "return" is received by the radar receiver. A simple corner reflector has three conducting sheet metal or screen surfaces at 90° angles to each other, attached to one another at the edges, to form a corner. The corner reflector reflects radio waves coming from in front of the corner reflector back parallel to the incoming beam. The reflecting surfaces of the corner reflector 380 are generally sized to be larger than several wavelengths of the radio waves to be reflected. In an example using X-band microwaves with wavelengths of 2.5-3.75 cm (1-1.5 inches), small corner reflectors less than 30 cm (12 inches) across may be used.

Figure 9:
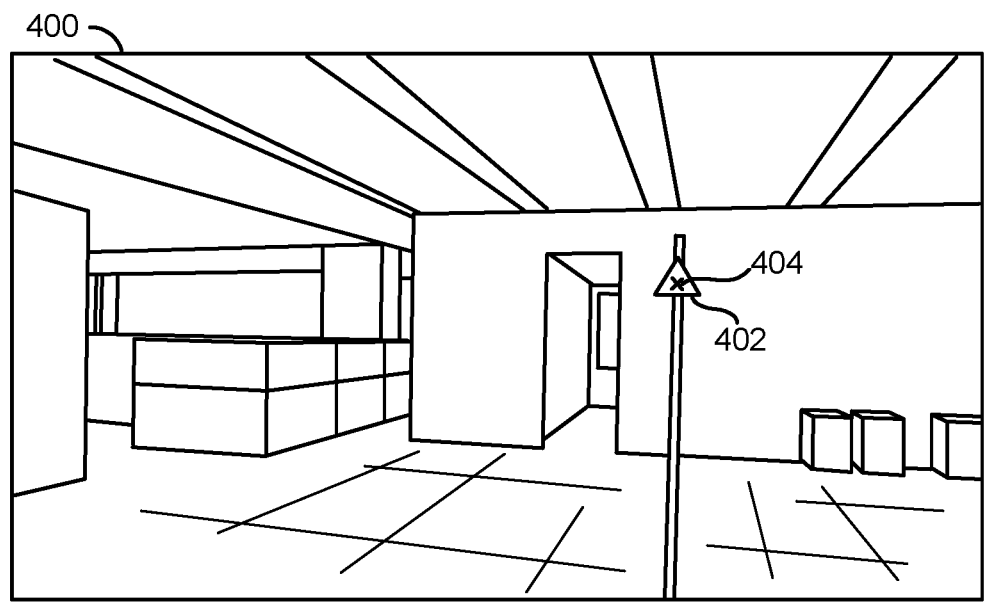
FIG. 9 is a diagram illustrating a 2D camera image of a field of view including a radar corner reflector.

Referring to FIG. 9, a diagram is shown illustrating a 2D camera image 400 of a field of view including a radar corner reflector 402. The radar corner reflector 402 is shown mounted on a support pole between the camera and a room wall. The coordinate $p_i$ of the center 404 of the radar corner reflector 402 is marked with an "x" symbol.

Figure 10:
FIG. 10 is a diagram illustrating a 4D point cloud corresponding to a portion of a field of view of a 4D millimeter-wave imaging radar containing the radar corner reflector of FIG. 8.

Referring to FIG. 10, a diagram is shown illustrating a 4D millimeter-wave imaging radar point cloud 500 corresponding to a portion of the field of view of the camera image 400 of FIG. 9 containing the radar corner reflector 402. A box 502 marks the point $P_i$ corresponding the point detected by a 4D imaging radar scanning the radar corner reflector 402.

Figure 11:
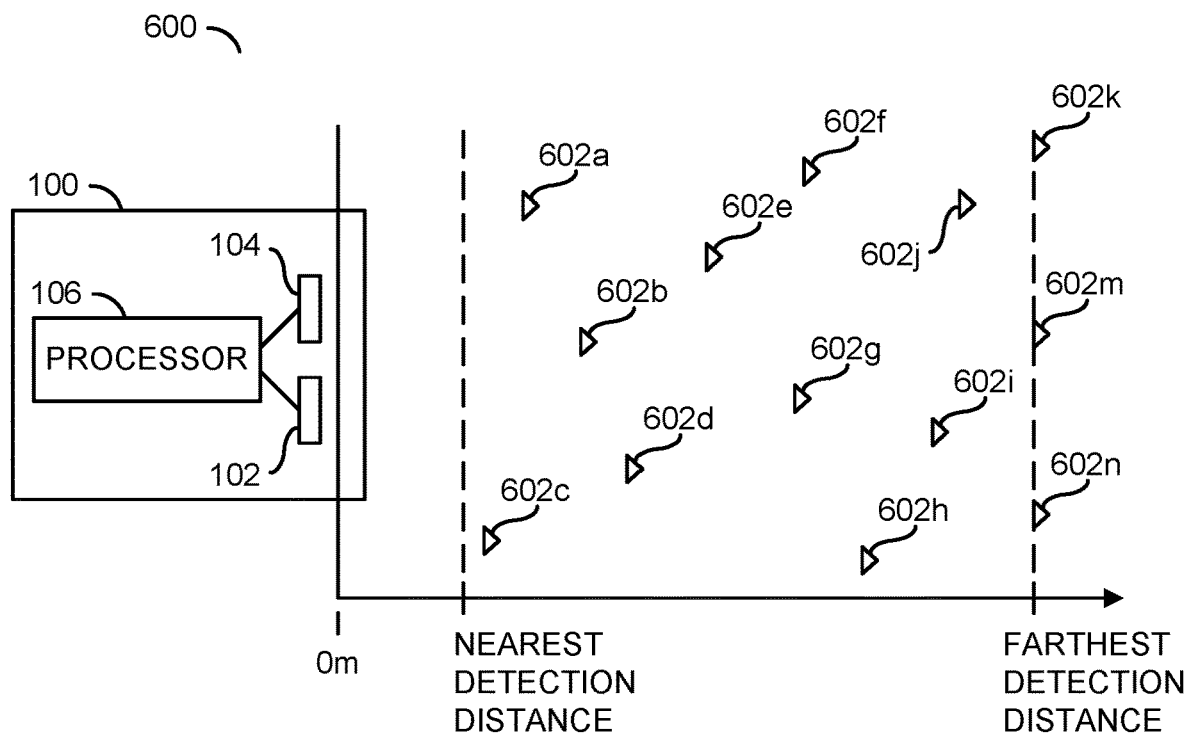
FIG. 11 is a diagram illustrating a bird's eye view of a calibration layout in accordance with an example embodiment of the present invention.

Referring to FIG. 11, a diagram is shown illustrating a bird's eye view of a calibration layout 600 in accordance with an example embodiment of the present invention. In an example, an apparatus 100 with a capture device 102, a 4D imaging radar sensor 104, and a processor 106 may be placed at an end (e.g., at a zero meter (m) mark) of a calibration layout 600. The capture device 102 and the 4D imaging radar sensor 104 are generally placed to ensure that the capture device 102 and the 4D imaging radar sensor 104 have a large enough common viewing area. A plurality of radar corner reflectors 602a-602n may be placed in different positions in the common viewing area. The positions of the radar corner reflectors 602a-602n are laid out at different locations and distances to cover the common viewing area of the capture device 102 and the 4D imaging radar sensor 104 as much as possible. The locations and distances include from a nearest detection distance (e.g., a point where the 4D imaging radar sensor 104 can detect the corresponding point cloud and the corner reflector 602a-602n is clear enough in an image captured by the capture device 102) to a farthest detection distance (e.g., a point where the 4D imaging radar sensor 104 can both detect the corresponding point cloud and the corresponding shape of the corner reflector can be discerned in the image captured by the capture device 102). The 4D imaging radar sensor 104 is then set to a close-range mode and each time data is collected, distortion-corrected pixel (image) data is collected at the same time as 4D radar point cloud data. Steps are generally taken to ensure that the capture device 102, the 4D imaging radar sensor 104, and corner reflector(s) 602a-602n are relatively stationary in the world coordinate system.

Figure 12:
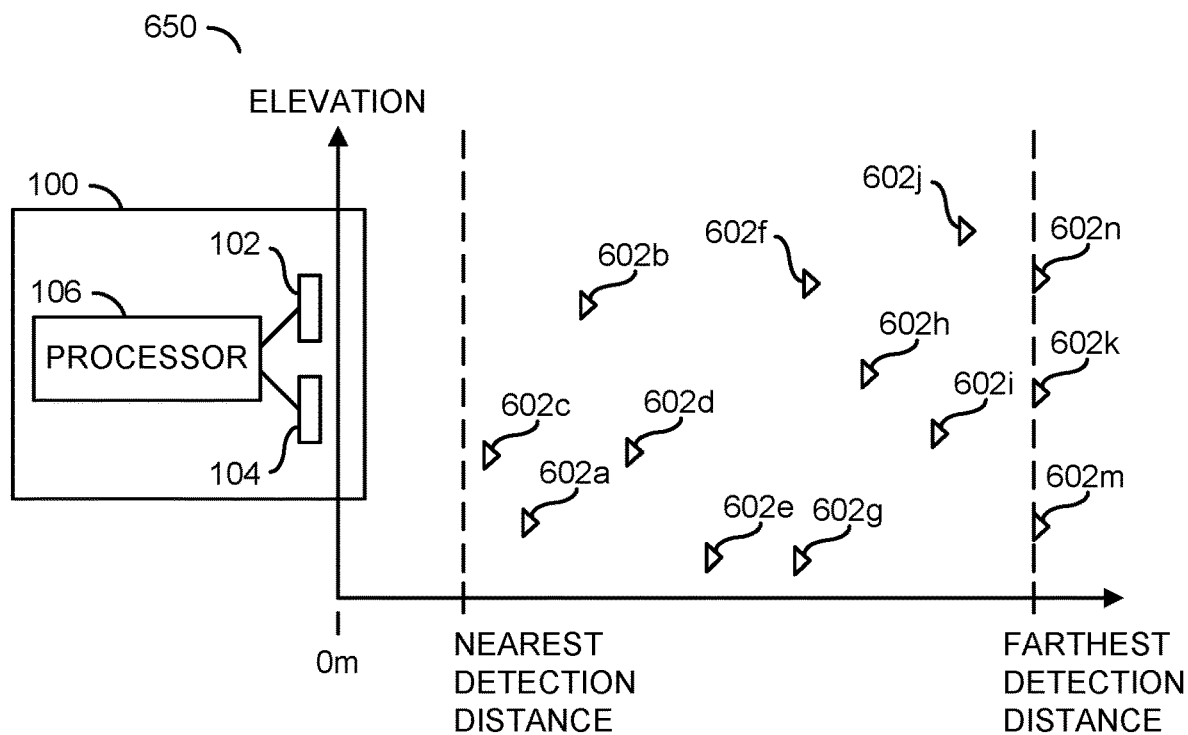
FIG. 12 is a diagram illustrating a side elevation view of a calibration layout in accordance with an example embodiment of the present invention.

Referring to FIG. 12, a diagram is shown illustrating a side elevation view 650 of the calibration layout 600 in accordance with an example embodiment of the present invention. The positions of the corner reflectors 602a-602n are generally distributed across a range of azimuth and elevation between the nearest detection distance and the farthest detection distance. The distribution of the corner reflectors 602a-602n helps ensure an accurate determination of the pose T=[RA] of the 4D imaging radar sensor 104 relative to the capture device 102.

Figure 13:
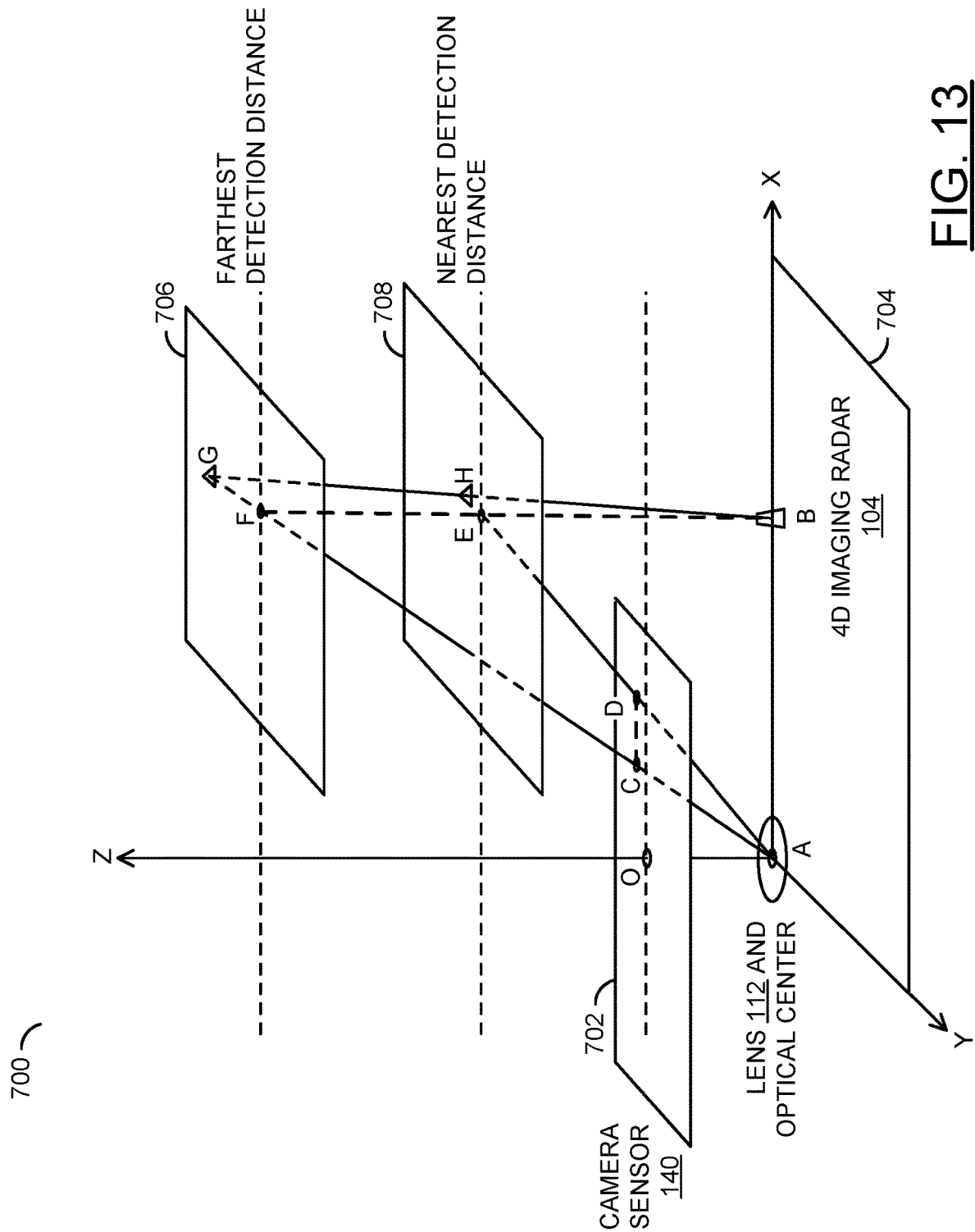
FIG. 13 is a diagram illustrating disparity determination for a 4D millimeter-wave imaging radar and camera system.

Referring to FIG. 13, a diagram is shown illustrating disparity from the capture device 102 with the 4D millimeter-wave imaging radar 104 well (accurately) mounted. In an example, a rectangular plane 702 of the camera sensor 140 may be parallel to an XY plane 704 containing the lens 112 of the camera 102 and the 4D imaging radar 104, and a pixel row of the sensor 140 (e.g., represented by a dashed line) may be aligned with the X-axis direction. A point A may be used to represent the optical center of the lens 112, a point B may be used to represent the mounting point of the 4D imaging radar 104. A point H and a point G may be used to represent one of the radar corner reflectors 602a-602n at the farthest detection distance 702 and the nearest detection distance 704, respectively, at different distances to the capture device 102. The radar corner reflector G may be captured by the camera sensor 140 at a point C, and the radar corner reflector H may be captured by the camera sensor 140 at a point D. Because of the difference in distance, the size of the radar corner reflector G captured by the camera sensor 140 at the point C generally appears smaller than the size of the radar corner reflector H captured by the camera sensor 140 at the point D. The disparity value is generally defined as the length of the line CD (e.g., the radar corner reflector shift from D to C when the radar corner reflector moves from H to G).

A plane ABG is generally defined by the three points A, B, and G. The plane ABG intersects the plane 702 of the image sensor 140 at the disparity line CD and intersects the XY plane 704 at the X-axis. Because the plane ABG intersects the plane 702 of the image sensor 140 at the disparity line CD and intersects the XY plane 704 at the X-axis, the disparity line CD is always parallel to the X-axis. The relative pose T=[R t] of the 4D imaging radar coordinate system relative to the camera coordinate system may be determined using extrinsic parameter calibration for 4D millimeter-wave radar and camera based on adaptive projection error in accordance with an example embodiment of the present invention.

Figure 14:
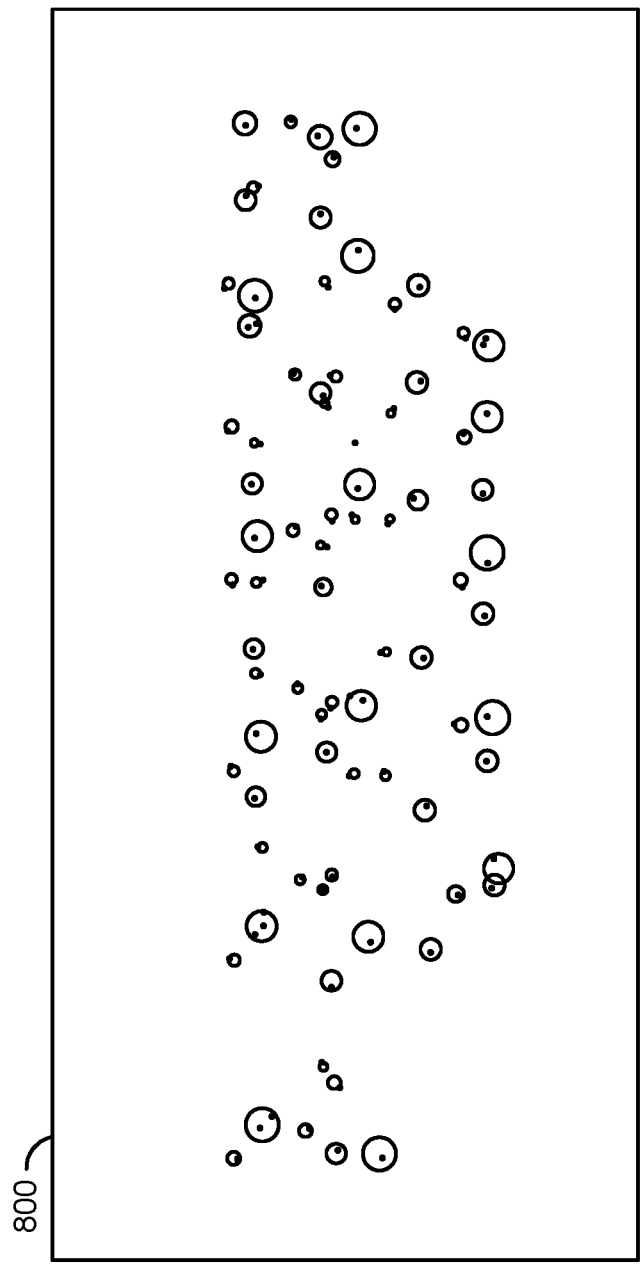
FIG. 14 is a diagram illustrating a point map result of extrinsic parameter calibration for 4D millimeter-wave radar and camera based on adaptive projection error in accordance with an example embodiment of the present invention.

Referring to FIG. 14, a diagram is shown illustrating a point map result of extrinsic parameter calibration for 4D millimeter-wave radar and camera based on adaptive projection error in accordance with an example embodiment of the present invention. In an example, the positions of the corner reflectors 602a-602n are represented by circles. The closer the reflectors are to the capture device 102 the larger the size of the circle. The projections of the corresponding 3D points are represented by black dots.

Figure 15:
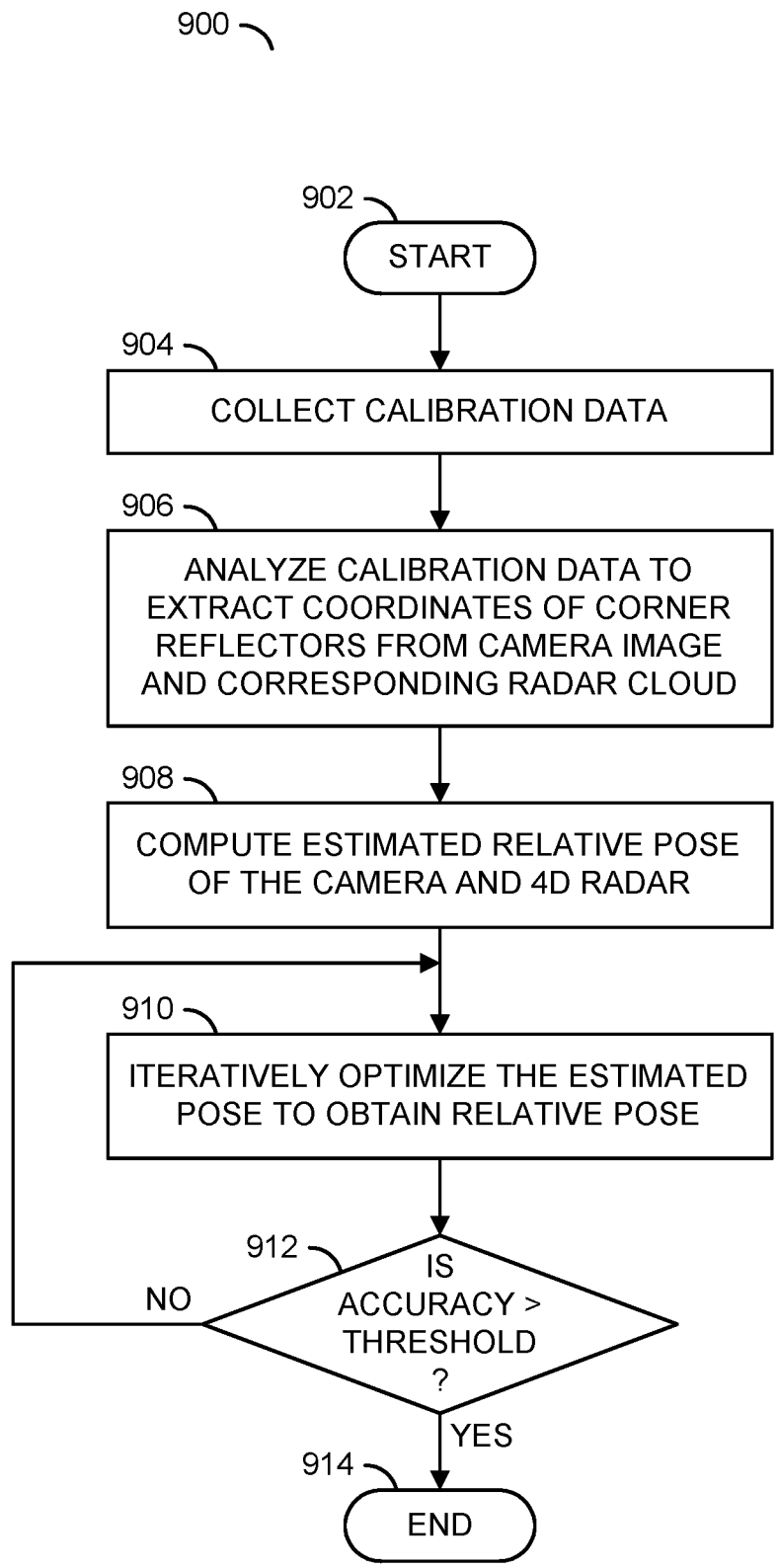
FIG. 15 is a flow diagram illustrating a process in accordance with an embodiment of the invention.

Referring to FIG. 15, a flow diagram is shown illustrating a process in accordance with an embodiment of the invention. In an example, a method (or process) 900 may implement an extrinsic parameter calibration method for 4D millimeter-wave radar and camera based on adaptive projection error in accordance with an embodiment of the invention. In an example, the method 900 may comprise a step (or state) 902, a step (or state) 904, a step (or state) 906, a step (or state) 908, a step (or state) 910, a decision step (or state) 912, and a step (or state) 914. The method 900 may start in the step 902 and move to the step 904.

In the step 904, the method 900 may collect calibration data. In an example, a capture device 102 and a 4D imaging radar sensor 104 may be placed to ensure that the capture device 102 and the 4D imaging radar sensor 104 have a large enough common viewing area. A plurality of radar corner reflectors 602a-602n may be placed in different positions in the common viewing area. The positions of the radar corner reflectors 602a-602n are laid out at different locations and distances to cover the common viewing area of the capture device 102 and the 4D imaging radar sensor 104 as much as possible. The locations and distances include from a nearest detection distance (e.g., a point where the 4D imaging radar sensor 104 can detect the corresponding point cloud and the corner reflector 602a-602n is clear enough in an image captured by the capture device 102) to a farthest detection distance (e.g., a point where the 4D imaging radar sensor 104 can both detect the corresponding point cloud and the corresponding shape of the corner reflector can be discerned in the image captured by the capture device 102). The positions of the corner reflectors 602a-602n are generally distributed across a range of azimuth and elevation between the nearest detection distance and the farthest detection distance. In an example, distortion-corrected camera image data and radar point cloud data may be collected using a 55 mm triangular prism corner reflector at a plurality (e.g., 100, 150, 200, etc.) positions with the 4D imaging radar sensor 104 set to a close-range mode. The method 900 may then move to the step 906.

In the step 906, the method 900 may analyze the calibration data to extract the coordinates $p_i$ ($p_i \in R^{2\times1}$, i=1, 2, ..., n) of the corner reflectors from the camera image and the corresponding coordinates $P_i$ ($P_i \in R^{3\times1}$) from the radar cloud image. In an example, the coordinates may be extracted manually or using pattern recognition. When the coordinates have been extracted, the method 900 may move to the step 908.

In the step 908, the method 900 may compute an estimated relative pose of the capture device 102 and the 4D imaging radar 104. In an example, a fast pose estimation process may be implemented using the internal parameter matrix K (K $\in R^{2\times3}$) of the camera. In an example, an Efficient Perspective-n-Pose (EPnP) method, as described in Lepetit V, Moreno-Noguer F, Fua P. EPnP: An Accurate O(n) Solution to the PnP Problem [J]. International Journal of Computer Vision, 2009, 81 (2):155-166), may be used to calculate preliminary estimates of the relative pose T. The method 900 may then move to the step 910.

In the step 910, the method 900 may iteratively optimize the estimated pose to obtain an optimized relative pose. In an example, the estimated pose may be optimized by constructing a least squares problem. In an example, a nonlinear least squares objective function may be constructed as follows. Let $$\vec{P}_{ci} = R^{-1}(P_i - t), \qquad \text{EQ. 2}$$

$$\min_{R,t} \sum_{i=1}^{n} \sigma_{Huber}\left(\left\| (K \cdot \Pi(\vec{P}_{ci}) - p_i) \cdot \frac{\vec{P}_{ci(3,1)}}{s_i} \right\|^2 \right),$$

$$\text{where } \Pi(x) = \begin{bmatrix} \frac{x_{(1,1)}}{x_{(3,1)}} \\ \frac{x_{(2,1)}}{x_{(3,1)}} \end{bmatrix} (x \in R^{3\times1}),$$

$\sigma_{Huber}$ is the Huber kernel function, and $s_i$ is the size of the corner reflector used to capture $p_i$ and $P_i$. The least squares problem may be minimized using the Dogleg iteration method with R an t determined to be the variables.

In the decision step 912, the method 900 may check whether an accuracy of the relative pose is greater than a threshold value. When the accuracy is not greater than the threshold value, the method 900 may return to the step 910 an perform another iteration. When the accuracy is greater than the threshold value, the method 900 may move to the step 914 and terminate. In an example, after the relative pose T is obtained by iterative optimization, a threshold $e_{thresh}$ may be set for determining whether a projection error e is small enough. For each pair of coordinates $p_i$ and $P_i$, the projection error $e_i$ may be determiner using the following Equation 3:

$$e_i = \left\| (K \cdot \Pi(\vec{P}_{ci}) - p_i) \cdot \frac{\vec{P}_{ci(3,1)}}{s_i} \right\|. \quad \text{EQ. 3}$$

For each pair of coordinates $p_i$ and $P_i$, when the projection error $e_i < e_{thresh}$, the obtained projection error from $P_i$ to $p_i$ is considered to be small enough. A value $n_{good}$ may be used to represent the total number of obtained projection errors that are small enough. The accuracy of the calibration results may be expressed by $a = n_{good}/n$, where n is the number of pairs of coordinates collected. Using $a = n_{good}/n$ to measure the quality of the calibration result, compared with directly measuring the projection errors, a better indication of the accuracy of the calibration result may be obtained.

For the data used for the calibration of the external parameters of the 4D millimeter-wave radar and the camera, the positions of the corner reflectors are generally located to cover the common viewing area of the camera and the 4D millimeter-wave radar as much as possible, and include different distances from the nearest (e.g., the radar can detect the corresponding point cloud and the corner reflector is clear enough in the camera image) to the farthest (e.g., the radar can detect the corresponding point cloud, and the corner reflector can distinguish the corresponding shape in the camera image). For a corner reflector of the same size, the farther the corner reflector is from the camera, the smaller the size in the camera image, the smaller the uncertainty of the coordinates of the radar point cloud projected to the camera image, the better the guarantee of the camera-to-radar relationship, and the more accurate the relative rotation matrix R will be. On the other hand, the closer the corner reflector is to the camera, the smaller the uncertainty of the depth after the radar point cloud is projected to the camera coordinate system, and the more accurate the relative translation vector t from the camera to the radar may be guaranteed.

Compared with the traditional 3D-2D method of minimizing the projection error objective function, in various embodiments, the method takes into account the different sizes of the corner reflector displayed in the camera image due to different distances. The new formula, Equation 2 above, modifies the scale of the projection error of the corner reflector while the size of the corner reflector is small in the image, and improves the accuracy of the calibration result, while ensuring the radar point Pi far away from the camera may also project onto the corresponding place on the camera image. Because the projection error of far and small objects is higher, a smaller projection error is needed. Using $a = n_{good}/n$ to measure the quality of the calibration result, compared with directly measuring the projection errors, a better indication of the accuracy of the calibration result may be obtained.

In an example, 150 pairs of coordinates $p_i$ and $P_i$ were collected using a 4D millimeter-wave radar and camera with a 55 mm triangular prism corner reflector. The pairs of coordinates $p_i$ and $P_i$ were used to calculate the relative posture T between the 4D millimeter-wave radar and the camera coordinate systems based on Equation 1 and Equation 2 above. The results using $e_{thresh} = 1.0$ and $s_i = 32.5$ may be summarized in the following Table 1:

TABLE 1

|  | Accuracy | Short distance accuracy (1~4 m) | Long distance accuracy (4~6 m) |
|---|---|---|---|
| Equation 1 method | 79/87 | 64/65 | 15/22 |
| Equation 2 method | 81/87 | 64/65 | 17/22 |

It may be seen that the calibration result based on the method in accordance with an embodiment of the invention more accurately aligns the position of the far point cloud onto the image.

At present, there is a lack of corresponding technical solutions between 4D millimeter-wave radar and camera extrinsic parameter calibration. In various embodiments, a method may be provided for calibrating external parameters between 4D millimeter-wave radar and camera, using at least one corner reflector as the calibration reference object. For a well-calibrated camera and a calibrated 4D millimeter-wave radar, 3D vision principles may be used to calculate the relative pose T=[R t] of the radar point cloud coordinate system relative to the camera coordinate system, where $T \in R^{3 \times 4}$, $R \in SO(3)$ represents the rotation matrix, and t e R 3<1 represents the translation vector.

The functions performed by the diagrams of FIGS. 1-15 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive (i) pixel data representing a first field of view of a camera and (ii) four-dimensional (4D) point cloud data representing a second field of view of a 4D imaging radar sensor; and
   a processor configured to (i) process the pixel data arranged as video frames and the 4D point cloud data, (ii) generate a plurality of center points in response to detecting a radar corner reflector in each of said video frames, (iii) generate a plurality of detection coordinates of said radar corner reflector in said 4D point cloud data, and (iv) calibrate extrinsic parameters for the 4D imaging radar sensor and the camera in response to a projection error based on pairs of said plurality of center points and said plurality of detection coordinates, wherein
   (a) said first field of view of said camera and said second field of view of said 4D imaging radar sensor overlap,
   (b) said pairs of said plurality of center points and said plurality of detection coordinates are determined in response to positioning said radar corner reflector at different locations in said overlap of said first field of view of the camera and the second field of view of the 4D imaging radar sensor between a near-distance value and a long-distance value, and
   (c) a scale of said projection error of said pairs are modified based on a size of the radar corner reflector in said video frames captured at said long-distance value.

2. The apparatus according to claim 1, wherein said pairs of said plurality of center points and said plurality of detection coordinates are determined based on whether a one of said center points in one respective field of view is matched in to one of said detection coordinates in another respective field of view.

3. The apparatus according to claim 1, wherein said radar corner reflector comprises a triangular prism corner reflector.

4. The apparatus according to claim 1, wherein an estimated relative pose is calculated between the 4D imaging radar sensor and the camera using an internal parameter matrix of the camera and an Efficient Perspective-n-Pose method.

5. The apparatus according to claim 4, wherein said estimated relative pose between the 4D imaging radar sensor and the camera is optimized using a nonlinear least squares equation that takes into account said size of the radar corner reflector.

6. The apparatus according to claim 1, wherein (i) said apparatus further comprises a memory configured to store said calibrated extrinsic parameters, and (ii) said processor is further configured to perform real-time processing of the pixel data and the 4D point cloud data utilizing the calibrated extrinsic parameters for the 4D imaging radar sensor stored in said memory.

7. The apparatus according to claim 6, wherein said processor is further configured to perform a sensor fusion process on the pixel data and the 4D point cloud data utilizing the calibrated extrinsic parameters for the 4D imaging radar sensor stored in said memory.

8. The apparatus according to claim 1, wherein (a) said extrinsic parameters comprise (i) a translation vector and (ii) rotation matrix, (b) said pairs captured at said near-distance value is used to determine an accuracy for said rotation matrix, (c) said pairs at said long-distance value is used to determine an accuracy for said translation vector.

9. The apparatus according to claim 8, wherein (i) said near-distance value comprises said location of said radar corner reflector closest to said apparatus that enables said detection coordinates are capable of being detected and said center point is detectable in said video frames, (ii) said near-distance value provides said accuracy for said rotation matrix based on a small uncertainty of a depth of said detection coordinates projected onto said video frame, (iii) said long-distance value comprises said location of said radar corner reflector farthest from said apparatus that enables said detection coordinates to be detected and a shape of said radar corner reflector to be detectable in said video frames, and (iv) said long-distance value provides said accuracy for said translation vector based on a small size of said radar corner reflector in said video frames providing a low uncertainty of said detection coordinates projected onto said video frames.

10. A method of extrinsic parameter calibration for 4D imaging radar sensor and camera comprising:
receiving (i) pixel data representing a first field of view of a camera and (ii) four-dimensional (4D) point cloud data representing a second field of view of a 4D imaging radar sensor;
processing (i) the pixel data arranged as video frames and (ii) the 4D point cloud data;
generating a plurality of center points based on detecting a radar corner reflector in each of said video frames;
generating a plurality of detection coordinates of said radar corner reflector in said 4D point cloud data; and
calibrating extrinsic parameters for the 4D imaging radar sensor and the camera based on a projection error based on pairs of said plurality of center points and said plurality of detection coordinates, wherein
  (a) said first field of view of said camera and said second field of view of said 4D imaging radar sensor overlap,
  (b) said pairs of said plurality of center points and said plurality of detection coordinates are determined based on positioning said radar corner reflector at different locations in said overlap of said first field of view of the camera and the second field of view of the 4D imaging radar sensor between a near-distance value and a long-distance value, and
  (c) a scale of said projection error said pairs are modified based on a size of the radar corner reflector in said video frames captured at said long-distanced value.

11. The method according to claim 10, wherein an estimated relative pose is calculated between the 4D imaging radar sensor and the camera using an internal parameter matrix of the camera and an Efficient Perspective-n-Pose method.

12. The method according to claim 11, wherein said estimated relative pose between the 4D imaging radar sensor and the camera is optimized using a nonlinear least squares equation that takes into account a said size of the radar corner reflector.

13. The method according to claim 10, wherein the different locations of the radar corner reflector are distributed across a range of azimuth and elevation.

14. The method according to claim 10, wherein (a) said extrinsic parameters comprise (i) a translation vector and (ii) rotation matrix, (b) said pairs captured at said near-distance value is used to determine an accuracy for said rotation matrix, (c) said pairs at said long-distance value is used to determine an accuracy for said translation vector.

15. The method according to claim 14, wherein optimizing an estimated relative pose between the 4D imaging radar sensor and the camera comprises performing an iteration method with said translate vector and said rotation matrix for the 4D imaging radar sensor as variables to minimize a nonlinear least squares equation.

16. The method according to claim 15, wherein optimizing said estimated relative pose between the 4D imaging radar sensor and the camera further comprises performing the iteration method until an accuracy threshold criteria is met.

17. The method according to claim 16, wherein determining whether the accuracy threshold criteria is met comprises calculating a respective projection error between each of said pairs of said plurality of center points and said plurality of detection coordinates, determining whether each respective projection error meets a projection error threshold criteria, and calculating a ratio of a number of the respective projection errors meeting the projection error threshold criteria to a total number of the pairs of said plurality of center points and said plurality of detection coordinates.

18. The method according to claim 14, wherein (i) said near-distance value comprises said location of said radar corner reflector closest to said camera and said 4D imaging radar sensor that enables said detection coordinates are capable of being detected and said center point is detectable in said video frames, (ii) said near-distance value provides said accuracy for said rotation matrix based on a small uncertainty of a depth of said detection coordinates projected onto said video frame, (iii) said long-distance value comprises said location of said radar corner reflector farthest from said camera and said 4D imaging radar sensor that enables said detection coordinates to be detected and a shape of said radar corner reflector to be detectable in said video frames, and (iv) said long-distance value provides said accuracy for said translation vector based on a small size of said radar corner reflector in said video frames providing a low uncertainty of said detection coordinates projected onto said video frames.

19. The method according to claim 10, wherein said radar corner reflector comprises a triangular prism corner reflector.

20. The method according to claim 10, wherein said pairs of said plurality of center points and said plurality of detection coordinates are determined based on whether a one of said center points in one respective field of view is matched in to one of said detection coordinates in another respective field of view.

* * * * *